United States Patent
Green et al.

(10) Patent No.: US 11,254,338 B2
(45) Date of Patent: Feb. 22, 2022

(54) GUIDEWAY MOUNTED VEHICLE LOCALIZATION AND ALIGNMENT SYSTEM AND METHOD

(71) Applicant: Thales Canada Inc, Toronto (CA)

(72) Inventors: Alon Green, Toronto (CA); Walter Kinio, Toronto (CA); Peter Timmermans, Toronto (CA)

(73) Assignee: THALES CANADA INC., Toronto (CA)

( * ) Notice: Subject to any disclaimer, the term of this patent is extended or adjusted under 35 U.S.C. 154(b) by 654 days.

(21) Appl. No.: 16/143,035

(22) Filed: Sep. 26, 2018

(65) Prior Publication Data
US 2019/0092360 A1    Mar. 28, 2019

Related U.S. Application Data

(60) Provisional application No. 62/564,212, filed on Sep. 27, 2017.

(51) Int. Cl.
*B61L 25/02* (2006.01)
*G01S 13/06* (2006.01)
(Continued)

(52) U.S. Cl.
CPC ............. *B61L 25/025* (2013.01); *B61L 5/125* (2013.01); *B61L 25/021* (2013.01); *G01S 13/06* (2013.01);
(Continued)

(58) Field of Classification Search
CPC ...... G01S 13/86; G01S 13/865; G01S 13/867; B61L 25/021; B61L 25/023; B61L 25/025; B61L 25/026; B61L 23/041
See application file for complete search history.

(56) References Cited

U.S. PATENT DOCUMENTS 4,863,123 A    9/1989  Bernard et al.
7,307,589 B1  12/2007  Gregoire et al.
(Continued)

FOREIGN PATENT DOCUMENTS

WO    2016167979 A1    10/2016

OTHER PUBLICATIONS

International Search Report and Written Opinion of the ISA from corresponding International Application No. PCT/IB2018/057474, dated Mar. 28, 2019, pp. 1-10, Canadian Intellectual Property Office, Quebec, Canada.
(Continued)

*Primary Examiner* — Zachary L Kuhfuss
(74) *Attorney, Agent, or Firm* — Hauptman Ham, LLP

(57) ABSTRACT

A system comprises a first sensor on a first end of a vehicle and an on-board controller coupled to the first sensor. The first sensor is configured to detect a radio frequency (RF) signature of a marker along a guideway. The first sensor is a radar detection device. The on-board controller is configured to determine a first position of the vehicle on the guideway or a first distance from the position of the vehicle to a stopping location along the guideway based on at least the RF signature received from the first sensor. The marker is a metasurface plate comprising a first diffused element, a first retroreflector element, a first absorbing element and a second diffused element between the first retroreflector element and the first absorbing element.

21 Claims, 11 Drawing Sheets

(51) Int. Cl.
  *G01S 13/86* (2006.01)
  *G01S 17/06* (2006.01)
  *G01S 17/58* (2006.01)
  *G01S 13/58* (2006.01)
  *G01S 13/75* (2006.01)
  *B61L 5/12* (2006.01)
  *G01S 13/88* (2006.01)
  *B61L 23/00* (2006.01)
  *H01Q 15/18* (2006.01)
  *H01Q 17/00* (2006.01)
  *H01Q 1/32* (2006.01)

(52) U.S. Cl.
  CPC .............. *G01S 13/58* (2013.01); *G01S 13/75* (2013.01); *G01S 13/865* (2013.01); *G01S 13/88* (2013.01); *G01S 17/06* (2013.01); *G01S 17/58* (2013.01); *B61L 23/00* (2013.01); *H01Q 1/3225* (2013.01); *H01Q 15/18* (2013.01); *H01Q 17/00* (2013.01)

(56) References Cited

U.S. PATENT DOCUMENTS

| | | | |
|---|---|---|---|
| 7,855,691 B2 | 12/2010 | Yonak et al. | |
| 9,327,743 B2* | 5/2016 | Green | B61L 25/028 |
| 9,387,867 B2* | 7/2016 | Ignatius | B61L 23/041 |
| 9,469,318 B2* | 10/2016 | Kanner | B61L 25/026 |
| 9,545,923 B2 | 1/2017 | Casse et al. | |
| 9,608,740 B2 | 3/2017 | Henry et al. | |
| 2010/0026562 A1 | 2/2010 | Hyodo et al. | |
| 2014/0218219 A1* | 8/2014 | Inomata | G01C 22/02 340/992 |
| 2015/0134155 A1* | 5/2015 | Kanner | B61L 25/023 701/19 |
| 2015/0175178 A1* | 6/2015 | Ignatius | B61L 15/0063 246/120 |
| 2015/0239482 A1* | 8/2015 | Green | B61L 23/041 246/122 R |
| 2017/0057528 A1 | 3/2017 | Green et al. | |
| 2017/0346565 A1 | 11/2017 | Dawson et al. | |
| 2019/0092360 A1* | 3/2019 | Green | B61L 15/0081 |
| 2020/0028272 A1* | 1/2020 | Green | H01Q 13/10 |
| 2020/0070859 A1* | 3/2020 | Green | G01S 17/58 |
| 2020/0070860 A1* | 3/2020 | Green | B61L 27/0005 |
| 2020/0132832 A1* | 4/2020 | Alalusi | G01S 13/9089 |
| 2020/0189633 A1* | 6/2020 | Green | B61L 23/041 |
| 2020/0191938 A1* | 6/2020 | Green | G01S 13/60 |
| 2020/0198673 A1* | 6/2020 | Green | G01C 9/18 |

OTHER PUBLICATIONS

Eck et al., James, "Meta-Reflector Antenna with Annular Pattern for Electromagnetic Orientation in UAS Applications," 2013 IEEE Antennas and Propagation Society International Symposium (APSURSI), IEEE, Department of Electrical and Computer Engineering, pp. 993-994, Brigham Young University, Provo, Utah.

European Search Report from corresponding European Application No. 18863123.8, dated Oct. 27, 2020, pp. 1-12, European Patent Office, Munich, Germany.

Emerging Technology from the arXiv; "How Metamaterials are Reinventing 3-D Radar Imaging", Mar. 10, 2017, pp. 1-7. https://www.technologyreview.com/s/603839/how-metamaterials-are-reinventing-3-d-radar/imaging/.

Seetharamdoo, Divitha et al., "Metamaterial for Trainborne Antenna Integration and Reduction of EMI between Onboard Systems in the Railway Environment", Challenge B: An Environmetely Friendly Railway; 9th World Congress on Railway Research, May 22-26, 2011; 7 pages; http://www.railway-research.org/IMG/pdf/b1_seetharamdoo_divitha.pdf.

Brookner, Dr. Eli; "Metamaterial Advances for Radar and Communications", Boston IEEE Photonics-AESS-ED-COMM Distinguished Lecture (DL), Nov. 9, 2017; 148 pages. http://www.bostonphotonics.org/files/EBrookner20171109.pdf.

\* cited by examiner

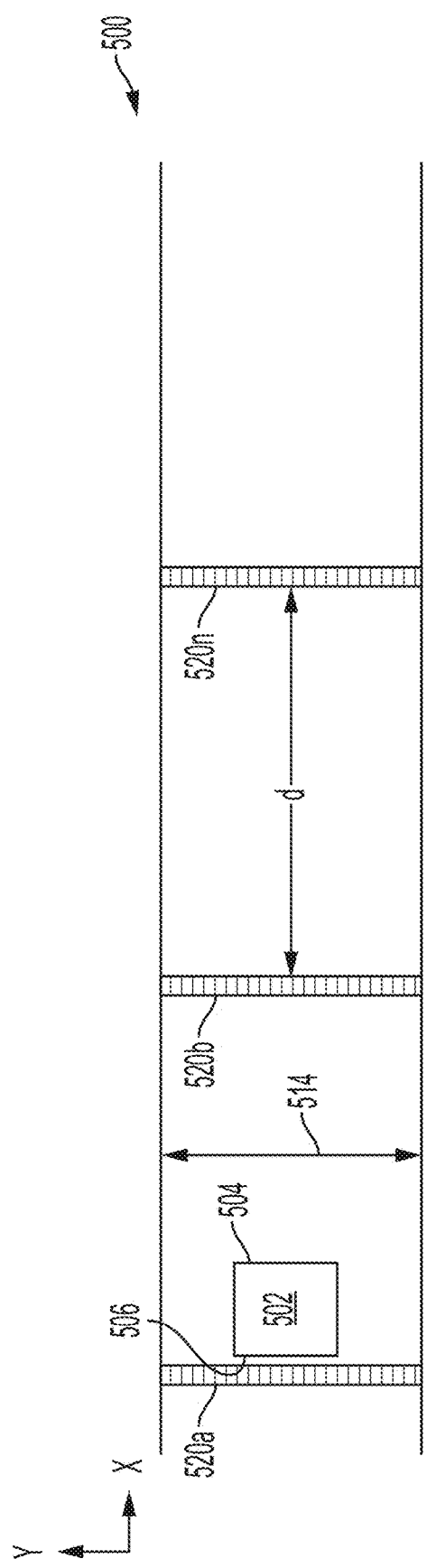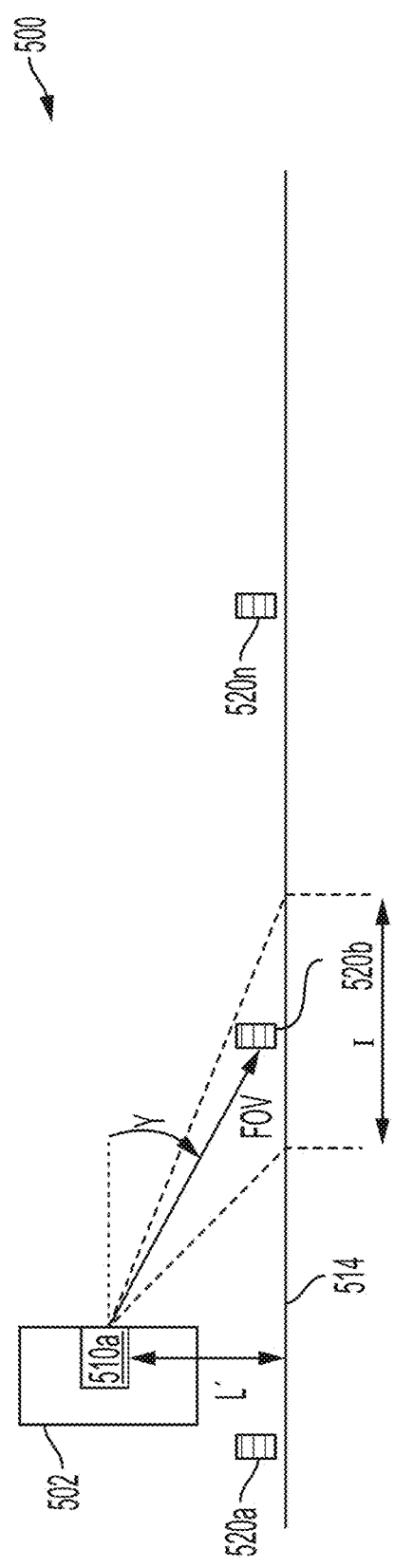
FIG. 5A
FIG. 5B ically designations represent like elements
GUIDEWAY MOUNTED VEHICLE LOCALIZATION AND ALIGNMENT SYSTEM AND METHOD

PRIORITY CLAIM

The present application claims the priority benefit of U.S. Provisional Patent Application No. 62/564,212, filed Sep. 27, 2017, the entirety of which is hereby incorporated by reference.

BACKGROUND

Guideway mounted vehicles include communication train based control (CTBC) systems to receive movement instructions from wayside mounted devices adjacent to a guideway. The CTBC systems are used to determine a location and a speed of the guideway mounted vehicle. The CTBC systems determine the location and speed by interrogating transponders positioned along the guideway. The CTBC systems report the determined location and speed to a centralized control system or to a de-centralized control system through the wayside mounted devices.

The centralized or de-centralized control system stores the location and speed information for guideway mounted vehicles within a control zone. Based on this stored location and speed information, the centralized or de-centralized control system generates movement instructions for the guideway mounted vehicles.

When communication between the guideway mounted vehicle and the centralized or de-centralized control system is interrupted, the guideway mounted vehicle is braked to a stop to await a manual driver to control the guideway mounted vehicle. Communication interruption occurs not only when a communication system ceases to function, but also when the communication system transmits incorrect information or when the CTBC rejects an instruction due to incorrect sequencing or corruption of the instruction.

BRIEF DESCRIPTION OF THE DRAWINGS

One or more embodiments are illustrated by way of example, and not by limitation, in the figures of the accompanying drawings, wherein elements having the same reference numeral designations represent like elements throughout. It is emphasized that, in accordance with standard practice in the industry various features may not be drawn to scale and are used for illustration purposes only. In fact, the dimensions of the various features in the drawings may be arbitrarily increased or reduced for clarity of discussion.

FIG. 5A is a top-side view of a guideway mounted vehicle, in accordance with one or more embodiments.

FIG. 5B is a side view of vehicle, in accordance with one or more embodiments.

DETAILED DESCRIPTION

The following disclosure provides many different embodiments, or examples, for implementing different features of the invention. Specific examples of components and arrangements are described below to simplify the present disclosure. These are examples and are not intended to be limiting.

Figure 1:
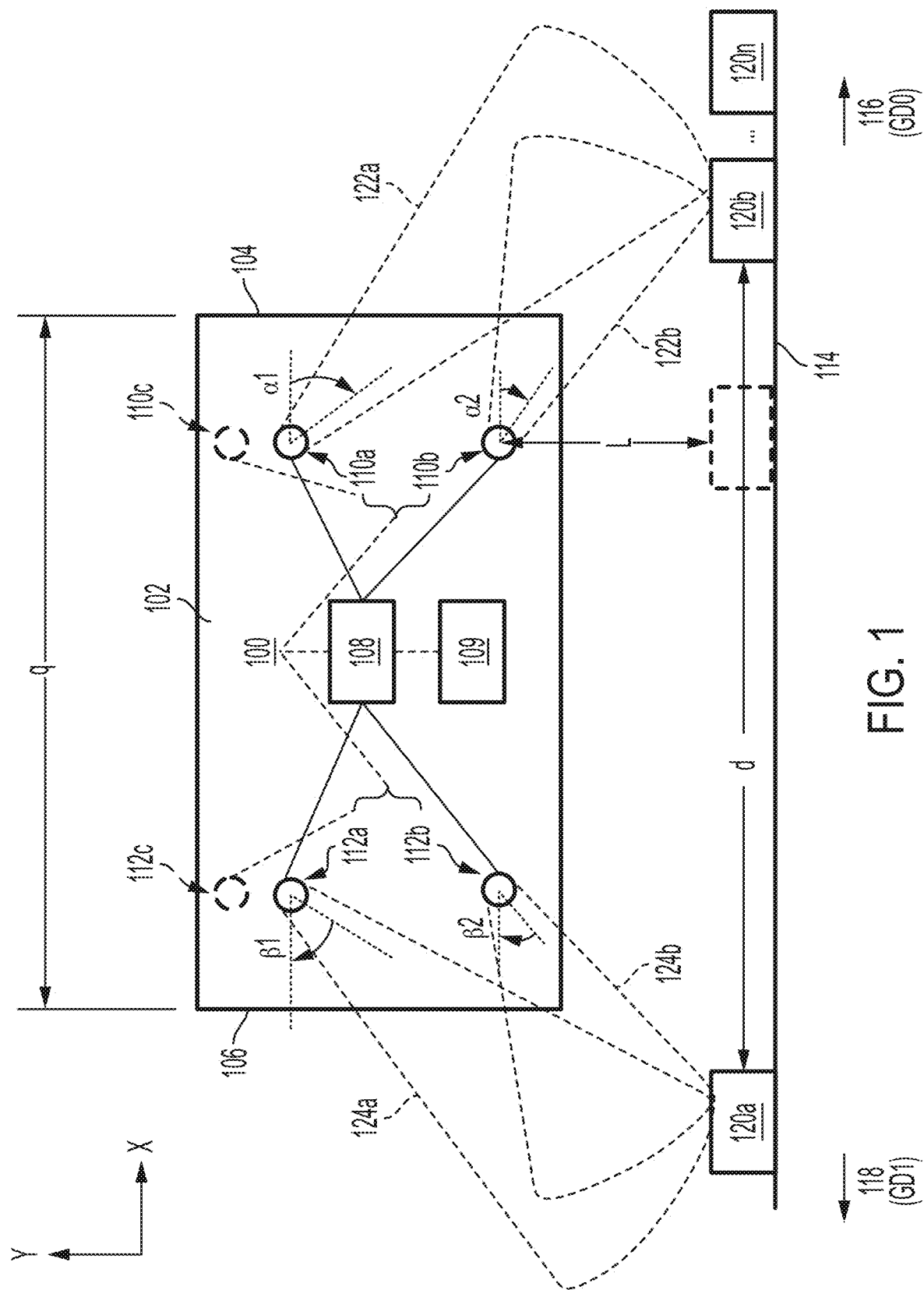
FIG. 1 is a diagram of a vehicle localization system, in accordance with one or more embodiments.

FIG. 1 is a diagram of a vehicle localization system 100, in accordance with one or more embodiments. Vehicle localization system 100 is associated with a vehicle 102 having a first end 104 and a second end 106. Vehicle localization system 100 comprises a controller 108, a memory 109, a first set of sensors including a first sensor 110a and a second sensor 110b (collectively referred to herein as the "first set of sensors 110") on the first end 104 of the vehicle 102, and a second set of sensors including a third sensor 112a and a fourth sensor 112b (collectively referred to herein as the "second set of sensors 112") on the second end 106 of the vehicle. In some embodiments, though described as a set of sensors, one or more of the first set of sensors 110 or the second set of sensors 112 includes only one sensor.

The controller 108 is electrically coupled with the memory 109, the sensors of the first set of sensors 110 and with the sensors of the second set of sensors 112. The controller 108 is on-board the vehicle 102. If on-board, the controller 108 is a vehicle on-board controller ("VOBC"). In some embodiments, one or more of the controller 108 or the memory 109 is off-board the vehicle 102. In some embodiments, the controller 108 comprises one or more of the memory 109 and a processor (e.g., processor 1002 (shown in FIG. 10)).

Vehicle 102 is configured to move along a guideway 114 in one of a first direction 116 or a second direction 118. In some embodiments, guideway 114 includes two spaced rails. In some embodiments, guideway 114 includes a monorail. In some embodiments, guideway 114 is along a ground. In some embodiments, guideway 114 is elevated above the ground. Based on which direction the vehicle 102 moves along the guideway 114, one of the first end 104 is a leading end of the vehicle 102 or the second end 106 is the leading end of the vehicle 102. The leading end of the vehicle 102 is the end of the vehicle 102 that corresponds to the direction of movement of the vehicle 102 along the guideway 114. For example, if the vehicle 102 moves in the first direction 116 (GD0), then the first end 104 is the leading end of the vehicle 102. If the vehicle 102 moves in the second direction 118 (GD1), then the second end 106 is the leading end of the vehicle 102. In some embodiments, the vehicle 102 is capable of being rotated with respect to the guideway 114 such that the first end 104 is the leading end of the vehicle 102 if the vehicle 102 moves in the second direction 118, and the second end 106 is the leading end of the vehicle 102 if the vehicle 102 moves in the first direction 116.

As the vehicle 102 moves in the first direction 116 or in the second direction 118 along the guideway 114, the sensors of the first set of sensors 110 and the sensors of the second set of sensors 112 are each configured to detect at least one marker of a set of markers 120a-120n, where n is a positive integer equal to or greater than 1. At least one marker of the set of markers 120a-120n are collectively referred to herein as "marker(s) 120." The sensors of the first set of sensors 110 and the sensor of the second set of sensors 112 are each configured to generate corresponding sensor data based on a detected marker 120. In some embodiments, markers 120 are part of system 100.

A marker 120 is, for example, a static object such as a sign, a shape, a pattern of objects, a distinct or sharp change in one or more guideway properties (e.g. direction, curvature, or other identifiable property) which can be accurately associated with a specific location, or some other suitable detectable feature or object usable to determine a geographic location of a vehicle. In some embodiments, the markers 120 include one or more of the metasurface plates 200, 320, 620, 710, 720, 730 or 800 as described in FIGS. 2, 3, 6A-6B, 7A-7C and 8. In some embodiments, markers 120 of the present disclosure are synonymous with the term "metasurface plate". One or more of the markers 120 are on the guideway 114. In some embodiments, one or more of the markers 120 are on a wayside of the guideway 114. In some embodiments, all of the markers 120 are on the guideway. In some embodiments, all of the markers 120 are on the wayside of the guideway. In some embodiments, the markers 120 comprise one or more of rails installed on the guideway 114, sleepers or ties installed on the guideway 114, rail baseplates installed on the guideway 114, garbage catchers installed on the guideway 114, boxes containing signaling equipment installed on the guideway 114, fence posts installed on the wayside of the guideway 114, signs installed on the wayside of the guideway 114, other suitable objects associated with being on the guideway 114 or on the wayside of the guideway 114. In some embodiments, at least some of the markers 120 comprise one or more different objects or patterns of objects compared to other markers 120. For example, if one marker 120 comprises a garbage catcher, a different marker 120 comprises a railroad tie.

Consecutive markers 120 are spaced apart by a distance d. In some embodiments, the distance d between consecutive markers 120 is substantially equal between all of the markers 120 of the set of markers 120a-120n. In some embodiments, the distance d between consecutive markers 120 is different between a first pair of markers 120 and a second pair of markers 120. The memory 109 comprises data that includes information describing the markers 120, a geographic position of the markers 120, and a unique RF signature of the markers 120 and/or a unique additional signature of the markers 120. In some embodiments, based on the detection of a marker 120, controller 108 is configured to query the memory 109 for the information describing the detected marker 120 such that the detected marker 120 has a location that is known to the controller 108. In some embodiments, the markers 120 generate at least a unique RF signature or another signature that are known by the controller 108, and the controller 108 is able to determine the position of the vehicle 102 from the corresponding unique RF signature, from information associated with the corresponding unique RF signature, the corresponding unique another signature or from information associated with the corresponding unique another signature.

Each of the sensors of the first set of sensors 110 and the sensors of the second set of sensors 112 is positioned on the first end 104 of the vehicle 102 or the second end of the vehicle 102 at a corresponding distance L from the markers 120. The distance L is measured in a direction perpendicular to the direction of movement of the vehicle 102, between each sensor of the first set of sensors 110 and each sensor of the second set of sensors 112 as the vehicle 102 moves past a same marker 120. For example, if the vehicle 102 is moving in the first direction 116, the first sensor 110a is positioned a distance L1 from marker 120a, and second sensor 110b is positioned a distance L2 from marker 120a. Similarly, as the vehicle 102 passes marker 120a, third sensor 112a is a distance L3 from marker 120a, and fourth sensor 112b is a distance L4 from marker 120a. The corresponding distances L1, L2, L3 and L4 are not shown in FIG. 1 to avoid obscuring the drawing.

The first sensor 110a has a first inclination angle $\alpha 1$ with respect to the detected marker 120. The second sensor 110b has a second inclination angle $\alpha 2$ with respect to the detected marker 120 different from the first inclination angle $\alpha 1$. The third sensor 112a has a third inclination angle $\beta 1$ with respect to the detected marker 120. The fourth sensor 112b has a fourth inclination angle $\beta 2$ with respect to the detected marker 120 of different from the fourth inclination angle 131. In some embodiments, the discussed inclination angles $\alpha 1$, $\alpha 2$, $\beta 1$ and $\beta 2$ are measured with respect to a corresponding horizon line that is parallel to the guideway 114. The corresponding horizon line for each sensor of the first set of sensors 110 and each sensor of the second set of sensors 112 is separated from the marker 120 by the corresponding distance L of each sensor of the first set of sensors 110 or each sensor of the second set of sensors 112.

In some embodiments, inclination angle $\alpha 1$ is substantially equal to inclination angle $\beta 1$, and inclination angle $\alpha 2$ is substantially equal to inclination angle $\beta 2$. If the markers 120 are on the guideway, then the sensors of the first set of sensors 110 and the sensors of the second set of sensors 112 are directed toward the guideway 114. In some embodiments, if the vehicle 102 is configured to move over the guideway 114, and the markers 120 are on the guideway, then the sensors of the first set of sensors 110 and the sensors of the second set of sensors 112 are directed downward toward the guideway 114. If the markers 120 are along the guideway 114 on the wayside of the guideway 114, then the sensors of the first set of sensors 110 and the sensors of the second set of sensors 112 are directed toward the wayside of the guideway 114.

Each of the sensors of the first set of sensors 110 and the sensors of the second set of sensors 112 has a corresponding field of view. Sensor 110a has a field of view 122a that is based on the position of sensor 110a on the first end 104 of the vehicle 102 and inclination angle $\alpha 1$. Sensor 110b has a field of view 122b that is based on the position of sensor 110b on the first end 104 of the vehicle 102 and inclination angle $\alpha 2$. Sensor 112a has a field of view 124a that is based on the position of sensor 112a on the second end 106 of the vehicle 102 and inclination angle β1. Sensor 112b has a field of view 124b that is based on the position of sensor 112b on the second end 106 of the vehicle 102 and inclination angle β2.

Field of view 122a overlaps with field of view 122b, and field of view 124a overlaps with field of view 124b. In some embodiments, one or more of field of view 122a and field of view 122b are non-overlapping, or field of view 124a and field of view 124b are non-overlapping. The position and inclination angle of each sensor 110 of the first set of sensors 110 is such that a detected marker 120 enters one of the field of view 122a or 122b, first, based on the direction the vehicle 102 moves along the guideway 114. Similarly, the position and inclination angle of each sensor 112 of the second set of sensors 112 is such that a detected marker 120 enters one of the field of view 124a or 124b, first, based on the direction the vehicle 102 moves along the guideway 114. In some embodiments, the markers 120 are spaced along the guideway 114 such that only one of the markers 120 is within field of view 122a or 122b at a time. Similarly, in some embodiments, the markers 120 are spaced along the guideway 114 such that only one of the markers 120 is within field of view 124a or 124b at a time. In some embodiments, the markers 120 are spaced along the guideway 114 such that only one of the markers 120 is within field of view 122a, 122b, 124a or 124b at a time. In some embodiments, markers 120 are spaced along the guideway 114 such that only one marker 120 is detected by the sensors of the first set of sensors 110 or the sensors of the second set of sensors 112 at a time. In other words, in some embodiments, a marker 120 is within field of view 122a and 122b, or within field of view 124a and 124b.

In some embodiments, the markers 120 are separated by a distance d that results in there being non-detection time between consecutive marker 120 detections as the vehicle 102 moves along the guideway 114.

In some embodiments, the distance d between consecutive markers 120 is set based on the frequency of the RADAR sensor of first set of sensors 110 or second set of sensors 112. For example, as the bandwidth or frequency of the radar increases, the minimum distance between each consecutive marker 120 decreases, and the consecutive markers 120 can be spaced closer to each other (FIG. 6C). Similarly, as the bandwidth or frequency of the radar decreases, the minimum distance between consecutive markers 120 increases, and the consecutive markers 120 are spaced further from each other (FIG. 6C). In some embodiments, if the consecutive markers 120 are not separated by a sufficient minimum distance, then the radar sensor of first set of sensors 110 or second set of sensors 112 may not be able to accurately discern or detect one or more retro reflecting or absorbing elements within marker 120 which would affect the determination of the position of marker 120.

In some embodiments, the distance d between consecutive markers 120 is set based on one or more of the velocity of the vehicle 102, processing time and delays of the controller 108, field of view 122a, 122b, 124a and/or 124b, the inclination angles α1, α2, β1, and/or β2, the separation distances L1, L2, L3 and/or L4 between the sensors and the markers 120, and/or a width of each marker 120 measured in the direction of movement of the vehicle 102.

First sensor 110a of the first set of sensors 110 and third sensor 112a of the second set of sensors 112 include one or more radio detection and ranging ("RADAR") sensors configured to detect an object or pattern of objects such as markers 120. In some embodiments, the RADAR sensor is configured to capture information in a microwave spectrum.

The RADAR sensor is capable of identifying the presence of an object as well as unique identifying characteristics of a detected object similar to an optical sensor (described below). In some embodiments, first sensor 110a and/or second sensor 110b includes a microwave emitter configured to emit electromagnetic radiation which is reflected off objects along the guideway or the wayside of the guideway. In some embodiments, first sensor 110a or third sensor 112a are configured to detect an RF signature of markers 120. In some embodiments, the RF signature includes one or more of a distance from the first sensor 110a or third sensor 112a to the markers 120, a relative velocity of vehicle 102 between the first sensor 110a or third sensor 112a and markers 120, an angular position of the first sensor 110a or third sensor 112a relative to markers 120 or a signal to noise ratio (SNR) of the echo signal received by first sensor 110a or third sensor 112a from markers 120.

Second sensor 110b of the first set of sensors 110 and fourth sensor 112b of the second set of sensors 112 include one or more of laser imaging detection and ranging ("LIDAR") sensors, cameras, infrared-based sensors, or other suitable sensors configured to detect an object or pattern of objects such as markers 120. In some embodiments, second sensor 110b or fourth sensor 112b is configured to detect another signature of markers 120. In some embodiments, the another signature includes one or more of a relative velocity of vehicle 102 between the second sensor 110b or fourth sensor 112b and markers 120, an angular position of the second sensor 110b or fourth sensor 112b relative to markers 120 or a signal to noise ratio (SNR) of the echo signal received by second sensor 110b or fourth sensor 112b from markers 120.

In some embodiments, second sensor 110b and/or fourth sensor 112b is an optical sensor configured to capture information in a visible spectrum. In some embodiments, second sensor 110b and/or fourth sensor 112b includes a visible light source configured to emit light which is reflected off objects along the guideway or the wayside of the guideway. In some embodiments, the optical sensor includes a photodiode, a charged coupled device (CCD), or another suitable visible light detecting device. The optical sensor is capable of identifying the presence of objects as well as unique identification codes associated with detected objects. In some embodiments, the unique identification codes include barcodes, quick response (QR) codes, alphanumeric sequences, pulsed light sequences, color combinations, images, geometric representations or other suitable identifying indicia.

In some embodiments, second sensor 110b and/or fourth sensor 112b includes a thermal sensor configured to capture information in an infrared spectrum. In some embodiments, second sensor 110b and/or fourth sensor 112b includes an infrared light source configured to emit light which is reflected off objects along the guideway or the wayside of the guideway. In some embodiments, the thermal sensor includes a Dewar sensor, a photodiode, a CCD or another suitable infrared light detecting device. The thermal sensor is capable of identifying the presence of an object as well as unique identifying characteristics of a detected object similar to the optical sensor.

In some embodiments, second sensor 110b and/or fourth sensor 112b includes a laser sensor configured to capture information within a narrow bandwidth. In some embodiments, second sensor 110b and/or fourth sensor 112b includes a laser light source configured to emit light in the narrow bandwidth which is reflected off objects along the guideway or the wayside of the guideway. The laser sensor is capable of identifying the presence of an object as well as unique identifying characteristics of a detected object similar to the optical sensor.

One or more sensors in first set of sensors 110 and/or second set of sensor 112 are capable of identifying an object without additional equipment such as a guideway map or location and speed information. The ability to operate without additional equipment decreases operating costs for first set of sensors 110 and second set of sensors 112 and reduces points of failure for system 100.

The above description is based on the use of four sensors, first sensor 110a, second sensor 110b third sensor 112a or fourth sensor 112b, for the sake of clarity. One of ordinary skill in the art would recognize that other number of sensors are able to be incorporated into the first set of sensors 110 and second set of sensors 112 without departing from the scope of this description. In some embodiments, redundant sensors which are a same sensor type as first sensor 110a, second sensor 110b third sensor 112a or fourth sensor 12b are included in system 100.

In some embodiments, locations of first sensor 110a and second sensor 110b of the first set of sensors 110 are swapped with each other. Similarly, in some embodiments, locations of third sensor 112a and fourth sensor 112b of the second set of sensors 112 are swapped with each other.

In some embodiments, first sensor 110a or third sensor 112a are configured to detect a corresponding first RF signature or a corresponding second RF signature of markers 120 that is known by controller 108. In some embodiments, the first RF signature is equal to the second RF signature. In some embodiments, the first RF signature is not equal to the second RF signature.

In some embodiments, the first RF signature includes one or more of a distance from the first sensor 110a to the markers 120, a relative velocity of vehicle 102 between the first sensor 110a and markers 120, an angular position of the first sensor 110a relative to markers 120 or an SNR of the echo signal received by first sensor 110a from markers 120.

In some embodiments, the second RF signature includes one or more of a distance from the third sensor 112a to the markers 120, a relative velocity of vehicle 102 between the third sensor 112a and markers 120, an angular position of the third sensor 112a relative to markers 120 or an SNR of the echo signal received by third sensor 112a from markers 120.

The controller 108 is configured to determine a first position (e.g., $P_{vehicle}$ in FIGS. 6A-6B) of vehicle 102 on guideway 114 or a first distance from the position of vehicle 102 to a stopping location along guideway 114 based on at least the first RF signature received from the first sensor 110a.

The controller 108 is configured to determine a second position (e.g., $P_{vehicle}$ in FIGS. 6A-6B) of vehicle 102 on guideway 114 or a second distance from the position of vehicle 102 to a stopping location along guideway 114 based on at least the second RF signature received from the third sensor 112a.

In some embodiments, controller 108 is configured to perform consistency checks between the first distance and the second distance by comparing the first distance with the second distance. In some embodiments, controller 108 determines that first sensor 110a and third sensor 112a are not faulty, if the first distance does not differ by more than a predefined tolerance from the second distance. In some embodiments, controller 108 determines that first sensor 110a and third sensor 112a are not faulty, if the first distance differs by more than the predefined tolerance from the second distance.

In some embodiments, controller 108 is configured to perform consistency checks between the first position and second position by comparing the first position with the second position. In some embodiments, controller 108 determines that first sensor 110a and third sensor 112a are not faulty, if the first position does not differ by more than a predefined tolerance from the second position. In some embodiments, controller 108 determines that first sensor 110a and third sensor 112a are faulty, if the first position differs by more than a predefined tolerance from the second position.

In some embodiments, second sensor 110b or fourth sensor 112b are configured to detect a corresponding first another signature or a corresponding second another signature of markers 120 that is known by controller 108. In some embodiments, the first another signature is equal to the second another signature. In some embodiments, the first another signature is not equal to the second another signature.

In some embodiments, the first another signature includes one or more of a distance from the second sensor 110b to the markers 120, a relative velocity of vehicle 102 between the second sensor 110b and markers 120, an angular position of the second sensor 110b relative to markers 120 or an SNR of the echo signal received by second sensor 110b from markers 120.

In some embodiments, the second another signature includes one or more of a distance from the fourth sensor 112b to the markers 120, a relative velocity of vehicle 102 between the fourth sensor 112b and markers 120, an angular position of the fourth sensor 112b relative to markers 120 or an SNR of the echo signal received by fourth sensor 112b from markers 120.

The controller 108 is configured to determine a third position (e.g., $P_{vehicle}$ in FIGS. 6A-6B) of vehicle 102 on guideway 114 or a third distance from the position of vehicle 102 to a stopping location along guideway 114 based on at least the first another signature received from the second sensor 110b.

The controller 108 is configured to determine a fourth position (e.g., $P_{vehicle}$ in FIGS. 6A-6B) of vehicle 102 on guideway 114 or a fourth distance from the position of vehicle 102 to a stopping location along guideway 114 based on at least the second another signature received from the third sensor 112a.

In some embodiments, controller 108 is configured to perform consistency checks between the third distance and the fourth distance by comparing the third distance with the fourth distance. In some embodiments, controller 108 determines that second sensor 110b and fourth sensor 112b are not faulty, if the third distance does not differ by more than a predefined tolerance from the fourth distance. In some embodiments, controller 108 determines that second sensor 110b and fourth sensor 112b are faulty, if the third distance differs by more than a predefined tolerance from the fourth distance.

In some embodiments, controller 108 is configured to perform consistency checks between the third position and fourth position by comparing the third position with the fourth position. In some embodiments, controller 108 determines that second sensor 110b and fourth sensor 112b are not faulty, if the third position does not differ by more than a predefined tolerance from the fourth position. In some embodiments, controller 108 determines that second sensor 110*b* and fourth sensor 112*b* are faulty, if the third position differs by more than a predefined tolerance from the fourth position.

In some embodiments, controller 108 is configured to perform consistency checks between the first distance and the third distance by comparing the first distance with the third distance. In some embodiments, controller 108 determines that first sensor 110*a* and second sensor 110*b* are not faulty, if the first distance does not differ by more than a predefined tolerance from the third distance. In some embodiments, controller 108 determines that first sensor 110*a* and second sensor 110*b* are faulty, if the first distance differs by more than a predefined tolerance from the third distance.

In some embodiments, controller 108 is configured to perform consistency checks between the second distance and the fourth distance by comparing the second distance with the fourth distance. In some embodiments, controller 108 determines that third sensor 112*a* and fourth sensor 112*b* are not faulty, if the second distance does not differ by more than a predefined tolerance from the fourth distance. In some embodiments, controller 108 determines that third sensor 112*a* and fourth sensor 112*b* are not faulty, if the second distance differs by more than a predefined tolerance from the fourth distance.

The controller 108 is configured to determine which of the first end 104 or the second end 106 of the vehicle 102 is the leading end of the vehicle 102 as the vehicle 102 moves along the guideway 114, determine a position of the leading end or trailing end of the vehicle 102 with respect to a detected marker 120, determine a position of the vehicle 102 with respect to a detected marker 120, and determine a velocity of the vehicle 102 as the vehicle 102 moves along the guideway 114.

In some embodiments, the controller 108 is configured to use one or more of the sensor data generated by the first sensor 110*a* or the second sensor 110*b* of the first set of sensors 110 as the sensor data for determining the leading end of the vehicle 102, the position of the leading end of the vehicle 102, the velocity of the vehicle 102, the velocity of the leading end of the vehicle 102, the length of the vehicle 102, the position of the trailing end of the vehicle 102, and/or the velocity of the trailing end of the vehicle 102. Similarly, the controller 108 is configured to use one or more of the sensor data generated by the third sensor 112*a* or the fourth sensor 112*b* of the second set of sensors 112 as the sensor data for determining the leading end of the vehicle 102, the position of the leading end of the vehicle 102, the velocity of the vehicle 102, the velocity of the leading end of the vehicle 102, the position of the trailing end of the vehicle 102, and/or the velocity of the trailing end of the vehicle 102.

In some embodiments, the controller 108 is configured to determine a start point of makers 120 based on a sequence of symbols associated with a first portion of the markers 120, and determine an end point of the markers 120 based on the sequence of symbols associated with a second portion of the markers 120.

In some embodiments, the controller 108 is configured to determine a leading end of vehicle 102 and a trailing end of vehicle 102 based on an order of the sequence of symbols associated with the first portion of markers 120 or the second portion of markers 120.

In some embodiments, to determine the position of the vehicle 102, the controller 108 is configured to query the memory 109 for information describing a detected marker 120. For example, the memory 109 includes location information describing the geographic location of the detected marker 120. In some embodiments, the memory 109 includes location information describing the distance d between marker 120 and a previously detected marker 120. The controller 108 uses the location information to calculate a position of the leading end of the vehicle 102 based on the sensor data generated by one or more of the first sensor 110*a* or the second sensor 110*b*. For example, the controller 108 is configured to calculate the position of the leading end of the vehicle 102 based on the distance d between marker 120*a* and marker 120*b*. In some embodiments, consecutive markers 120 are pairs of markers separated by a distance d stored in memory 109.

In some embodiments, the sensors of the first set of sensors 110 and the sensors of the second set of sensors 112 are configured to determine a distance between the sensor and the detected marker 120 in the field of view of the sensor along the line of sight of the sensor. In some embodiments, the controller 108 is configured to use the distance between the sensor and the detected marker 120 to calculate the position of the vehicle 102.

In some embodiments, the controller 108 is configured to determine a relative velocity $V_{RELATIVE}$ between the sensors of the first set of sensors 110 and/or the sensors of the second set of sensors 112 and the detected marker 120.

The controller 108 is configured to perform consistency checks to compare the determinations or calculations that are based on the sensor data generated by the sensors of the first set of sensors 110 and the sensors of the second set of sensors 112.

In some embodiments, the controller 108 is configured to determine if a leading end determination based on the sensor data generated by the sensors of the first set of sensors 110 matches a leading end determination based on the sensor data generated by the sensors of the second set of sensors 112. In some embodiments, the controller 108 is configured to determine if a position or distance traveled calculation based on the sensor data generated by the sensors of the first set of sensors 110 matches a corresponding position or distance traveled calculation based on the sensor data generated by the sensors of the second set of sensors 112.

The controller 108 is configured to identify one or more of the first sensor 110*a*, the second sensor 110*b*, the third sensor 112*a* or the fourth sensor 112*b* as being faulty based on a determination that a mismatch between one or more of the calculated leading end of the vehicle 102, the calculated position of the vehicle 102, the calculated distance the vehicle 102 traveled, or the calculated velocity of the vehicle 102 results in a difference between the calculated values that is greater than a predefined threshold. The controller 108, based on a determination that at least one of the sensors is faulty, generates a message indicating that at least one of the sensors is in error. In some embodiments, the controller 108 is configured to identify which sensor of the first set of sensors 110 or the second set of sensors 112 is the faulty sensor based on the sensor that has position data that is different from the position data from the other sensors.

Similarly, in some embodiments, the controller 108 is configured to generate an alarm if the position of the leading end of the vehicle 102 calculated based on the sensor data generated by one of more of the first sensor 110*a* or the second sensor 110*b* differs from the position of the leading end of the vehicle 102 calculated based on the sensor data generated by one or more of the third sensor 112*a* or the fourth sensor 112*b* by more than a predefined threshold.

In some embodiments, if the calculated position of the leading end of the vehicle 102 based on the sensor data generated by the first set of sensors differs from the position of the leading end of the vehicle based on the sensor data generated by the second set of sensors by more than the predefined threshold, the controller 108 is configured to cause the vehicle 102 to be braked to a stop via an emergency brake actuated by the controller 108 or to increase or decrease the speed of the vehicle 102.

The sensors of the first set of sensors 110 and the sensors of the second set of sensors 112 are positioned on the first end 104 or the second end 106 of the vehicle 102 independent of any wheel and/or gear of the vehicle 102. As a result the calculated velocity of the vehicle 102, position of the vehicle 102, distance traveled by the vehicle 102, or the determination of the leading end of the vehicle 102 are not sensitive to wheel spin or slide or wheel diameter calibration errors, making the calculations made by the system 100 more accurate than wheel-based or gear-based velocity or position calculations. In some embodiments, the system 100 is capable of calculating the speed and/or the position of the vehicle 102 to a level of accuracy greater than wheel-based or gear-based techniques, even at low speeds, at least because the sensors of the first set of sensors 110 and the sensors of the second set of sensors 112 make it possible to calculate a distance traveled from, or a positional relationship to, a particular marker 120 to within about +/−5 centimeters (cm).

Additionally, by positioning the sensors of the first set of sensors 110 and the sensors of the second set of sensors 112 away from the wheels and gears of the vehicle, the sensors of the first set of sensors 110 and the sensors of the second set of sensors 112 are less likely to experience reliability issues and likely to require less maintenance compared to sensors that are installed on or near a wheel or a gear of the vehicle 102.

In some embodiments, system 100 is capable of detecting markers 120 from relatively long distances (>30 m) resulting in greater accuracy of the position of vehicle 102 than wheel-based or gear-based techniques.

Figure 2:
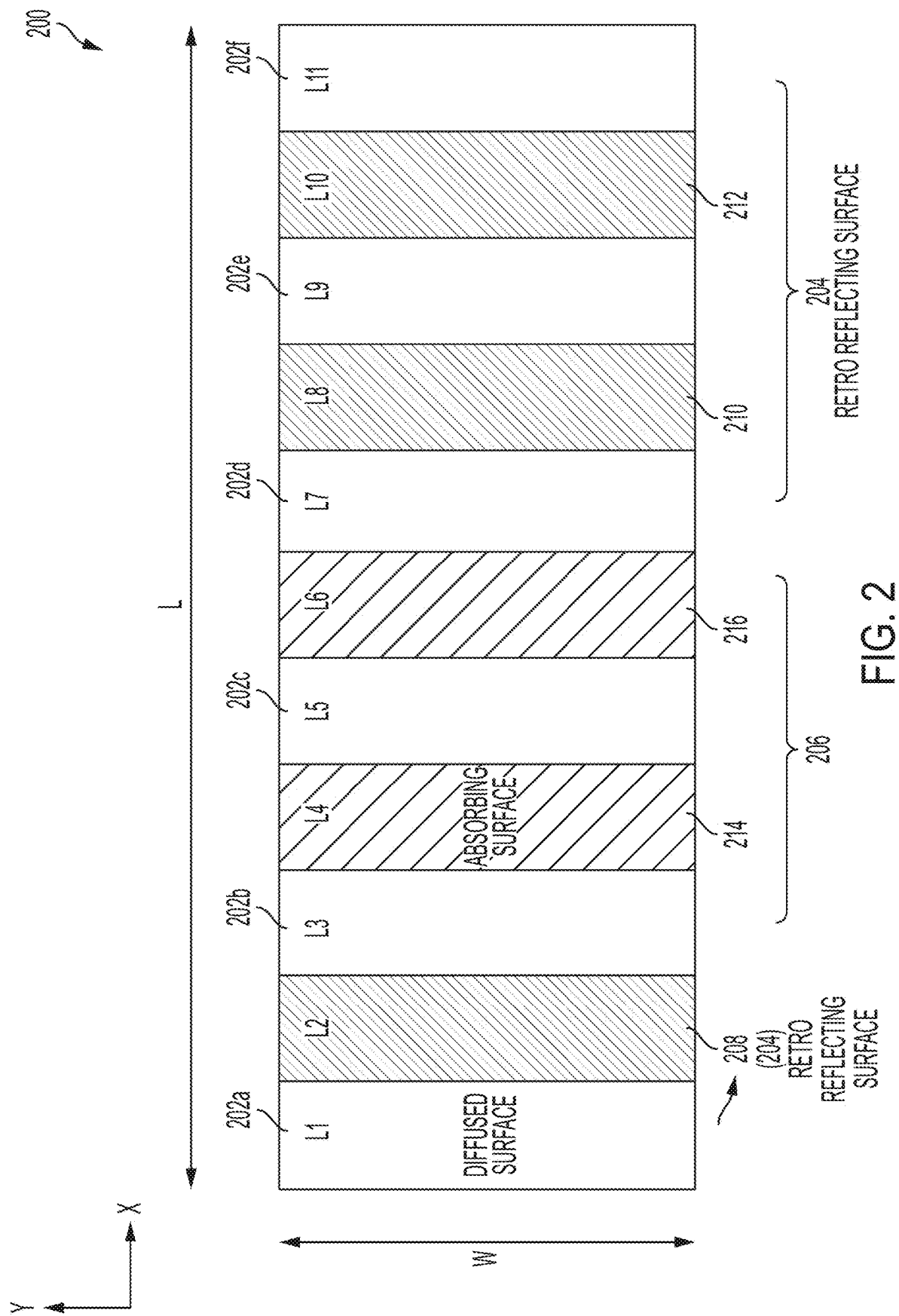
FIG. 2 is a diagram of a metasurface plate, in accordance with one or more embodiments.

FIG. 2 is a diagram of a metasurface plate 200, in accordance with one or more embodiments.

Metasurface plate 200 is a flat plate including one or more of a set of diffused elements 202, a set of retro reflecting elements 204 or a set of absorbing elements 206. In some embodiments, metasurface plate 200 is not flat.

Set of diffused elements 202 includes one or more of diffused elements 202a, 202b, 202c, 202d, 202e or 202f. Set of retro reflecting elements 204 includes one or more of retro reflecting elements 208, 210 or 212. Set of absorbing elements 206 includes one or more of absorbing elements 214 or 216.

In some embodiments, at least a diffused element of the set of diffused elements 202 is positioned between at least two elements from the set of retro reflecting elements 204 or the set of absorbing elements 206. For example, diffused element 202b is between retro reflecting element 208 and absorbing element 214. Diffused element 202c is between absorbing elements 214 and 216. Diffused element 202d is between absorbing element 216 and retro reflecting element 210. Diffused element 202e is between retro reflecting element 210 and retro reflecting element 212.

Diffused element 202a is on a first end of metasurface plate 200, and diffused element 202 is on a second end of metasurface plate 200. In some embodiments, the second end of metasurface plate 200 is opposite from the first end of metasurface plate 200.

In some embodiments, one or more of retro reflecting elements 208, 210 or 212 includes at least a metal or a metal compound. In some embodiments, one or more of retro reflecting elements 208, 210 or 212 includes at least aluminum, iron, steel, or the like.

In some embodiments, at least one retro reflecting element of the set of retro reflecting elements 204 is configured to reflect an incident electromagnetic wavefront back along a vector that is parallel to, but opposite in direction from the wave's source.

In some embodiments, one or more of absorbing elements 214 or 216 includes at least a foam material, a foam compound, or the like. In some embodiments, one or more of absorbing elements 214 or 216 includes at least a foam material inside a plastic box.

In some embodiments, one or more of diffused elements 202a, 202b, 202c, 202d, 202e or 202f includes at least a ballast, a sleeper, a concrete material, or the like. In some embodiments, one or more of diffused elements 202a, 202b, 202c, 202d, 202e or 202f includes at least a material or structure capable of generating an SNR profile, similar to that shown in FIGS. 7A-7C, relative to that of set of retro reflecting elements 204 or set of absorbing elements 206.

Metasurface plate 200 has a width in the Y direction, and a length in the X direction. Each of the elements (202a, 208, ..., 202f) of metasurface plate 200 has a corresponding length (e.g., L1, L2, ..., L11) in the X direction.

Figure 6A:
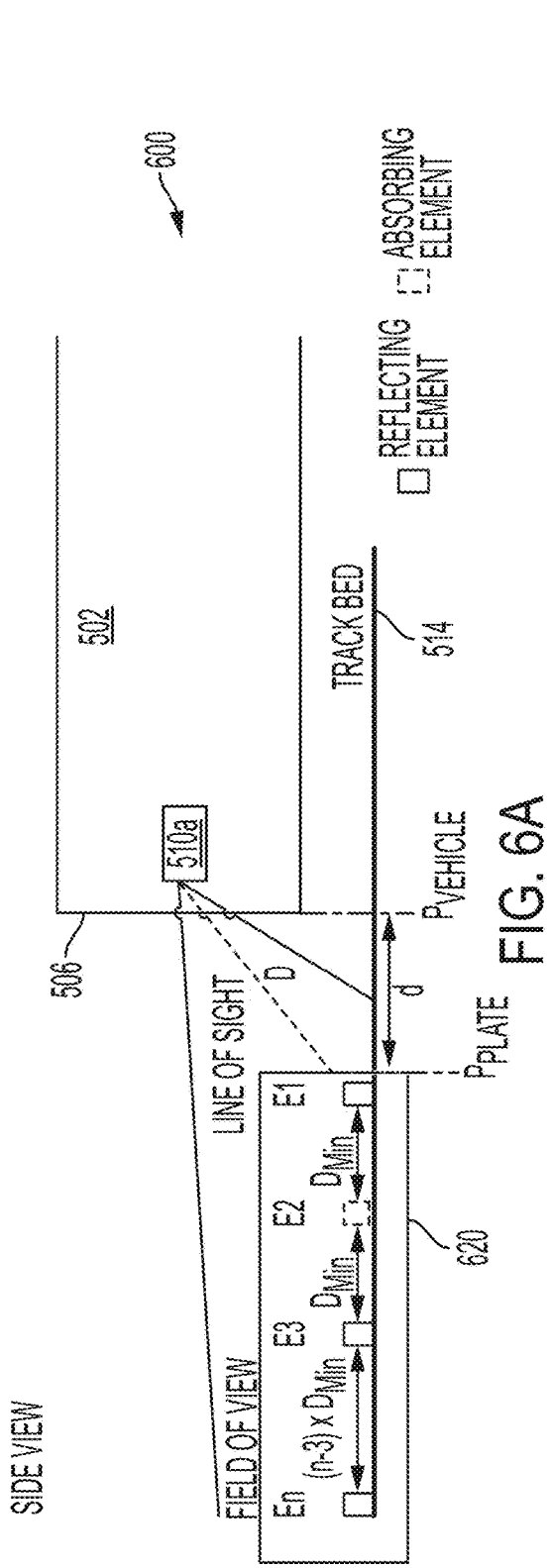
FIG. 6A is a side view of a system, in accordance with one or more embodiments.
Figure 6B:
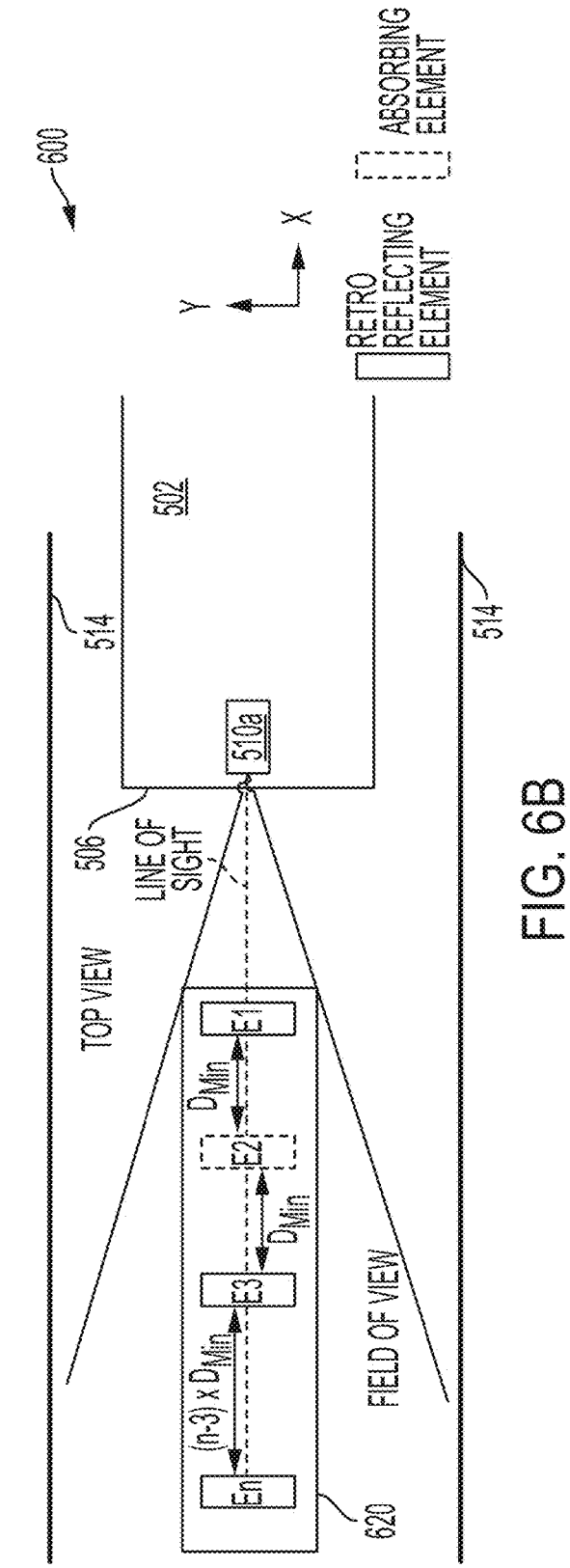
FIG. 6B is a top-side view of system, in accordance with one or more embodiments.
Figure 6C:
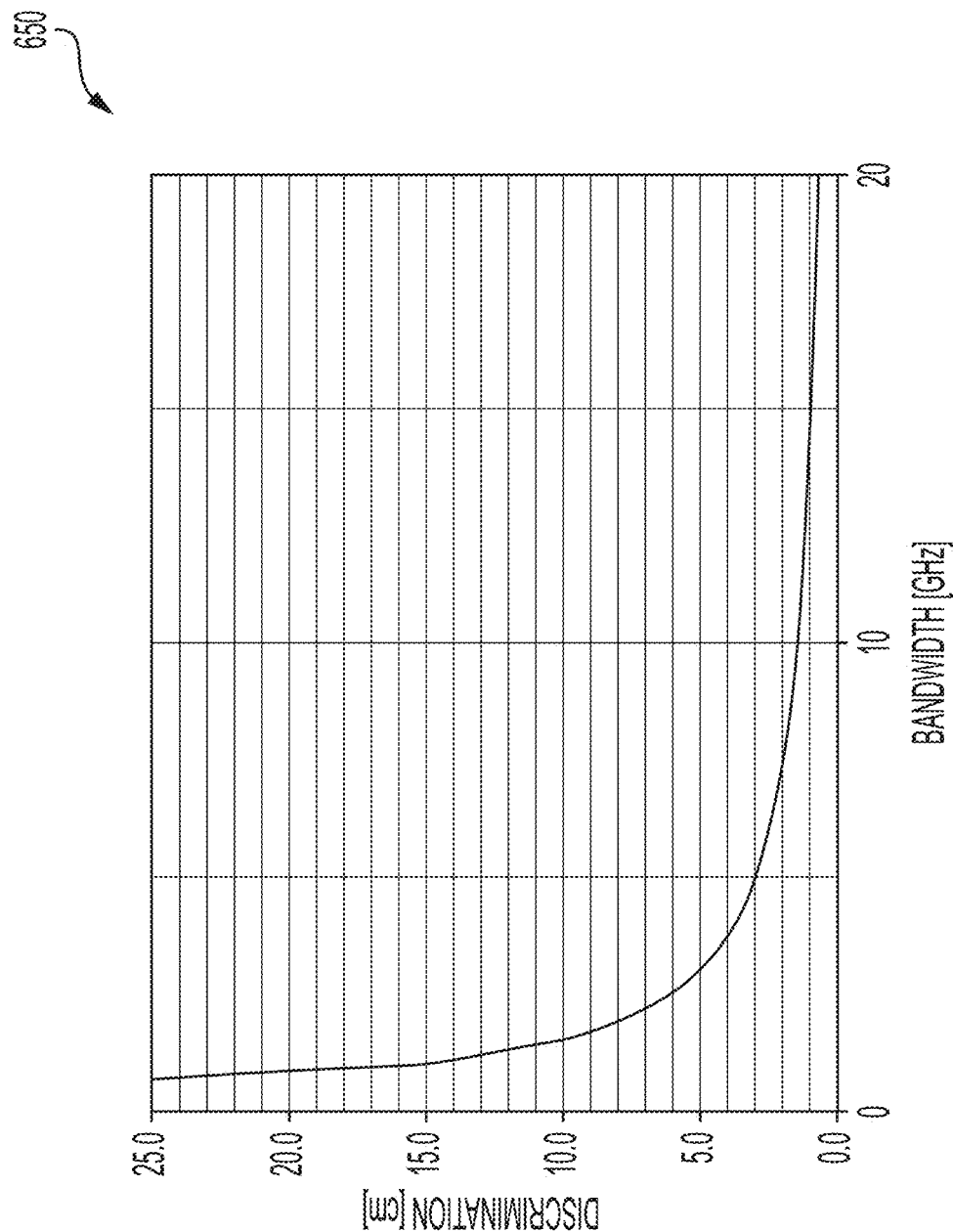
FIG. 6C is a view of a curve, in accordance with one or more embodiments.

In some embodiments, the length L1, L3, L5, L7, L9 and L11 of corresponding diffusion elements 202a, 202b, 202c, 202d, 202e and 202f are used to ensure sufficient separation distance Dmin (FIGS. 6A-6C) is between the elements of metasurface plate 200 allowing the radar sensor of set of sensors 110 or 112 to properly discriminate between the different elements as discussed in FIG. 6A-6C.

In some embodiments, the area or size of one or more elements within metasurface plate 200 is determined by at least the radar emitted power, the power of the echo signal, or the environment the metasurface plate 200 is installed. In some embodiments, metasurface plate 200 is configured to generate an SNR profile similar to that shown in FIG. 7A-7C or 8.

For example, the area of metasurface plate 200 is equal to the length L multiplied by the width W. The signal to noise ratio (SNR) of the echo signal or the amount of power reflected by metal surface plate 200 is proportional to the area of metasurface plate 200. For example, as the area of metasurface plate 200 increases, the SNR of the echo signal or the amount of power reflected by metasurface plate 200 increases. For example, as the area of metasurface plate 200 decreases, the SNR of the echo signal or the amount of power reflected by metasurface plate 200 decreases.

For example, as the length (e.g., L2, L8 or L10) or width W of retro reflecting elements 208, 210 or 212 in metasurface plate 200 increases, the SNR of the echo signal or the amount of power reflected by metasurface plate 200 increases. Similarly, as the length (e.g., L2, L8 or L10) or width W of retro reflecting elements 208, 210 or 212 in metasurface plate 200 decreases, the SNR of the echo signal or the amount of power reflected by metasurface plate 200 decreases.

For example, as the length (e.g., L4 or L6) or width W of absorbing elements 214 or 216 in metasurface plate 200 increases, the SNR of the echo signal or the amount of power reflected by metasurface plate 200 decreases. Similarly, as the length (e.g., L4 or L6) or width W of absorbing elements 214 or 216 in metasurface plate 200 decreases, the SNR of the echo signal or the amount of power reflected by metasurface plate 200 increases.

In some embodiments, if the areas of the metasurface elements are not large enough, then the echo signal detected by the radar sensor of first sensor 110a or third sensor 112a may not be large enough to accurately discern or detect one or more metasurface elements within metasurface plate 200 which would affect the RF signature of metasurface plate 200 detected by system 100.

In some embodiments, metasurface 200 creates a unique RF signature detected by the radar of set of sensors 110 or 112 to localize vehicle 102 on guideway 114, and to provide a landmark vehicle 102 is should aligned with if located at the platform (not shown) where vehicle 102 is expected to stop at.

In some embodiments, the unique RF signature includes the echo received from the metasurface plate 200. In some embodiments, the echo received from the set of retro reflecting elements 204 has a sufficient SNR margin (>10 dB) with respect to the echo received from the set of diffused elements 202. In some embodiments, the echo received from the set of absorbing elements 206 has a sufficient SNR margin (<10 dB) with respect to the echo received from the set of diffused elements 202 such that there is a difference of at least 20 dB between the SNR of the echo signal received from the set of retro reflecting elements 204 and the set of absorbing elements 206. Other SNR values of echo signals received from elements within the set of diffused elements 202, set of retro reflecting elements 204 or set of absorbing elements 206 are within the scope of the present disclosure.

In some embodiments, the SNR's of each element in metasurface plate 200 are associated with a corresponding identification symbol or corresponding plate element that is used by controller 108 to identify a location of metasurface plate 200.

Other quantities, configurations or order of elements within the set of diffused elements 202, set of retro reflecting elements 204 or set of absorbing elements 206 are within the scope of the present disclosure.

Figure 3:
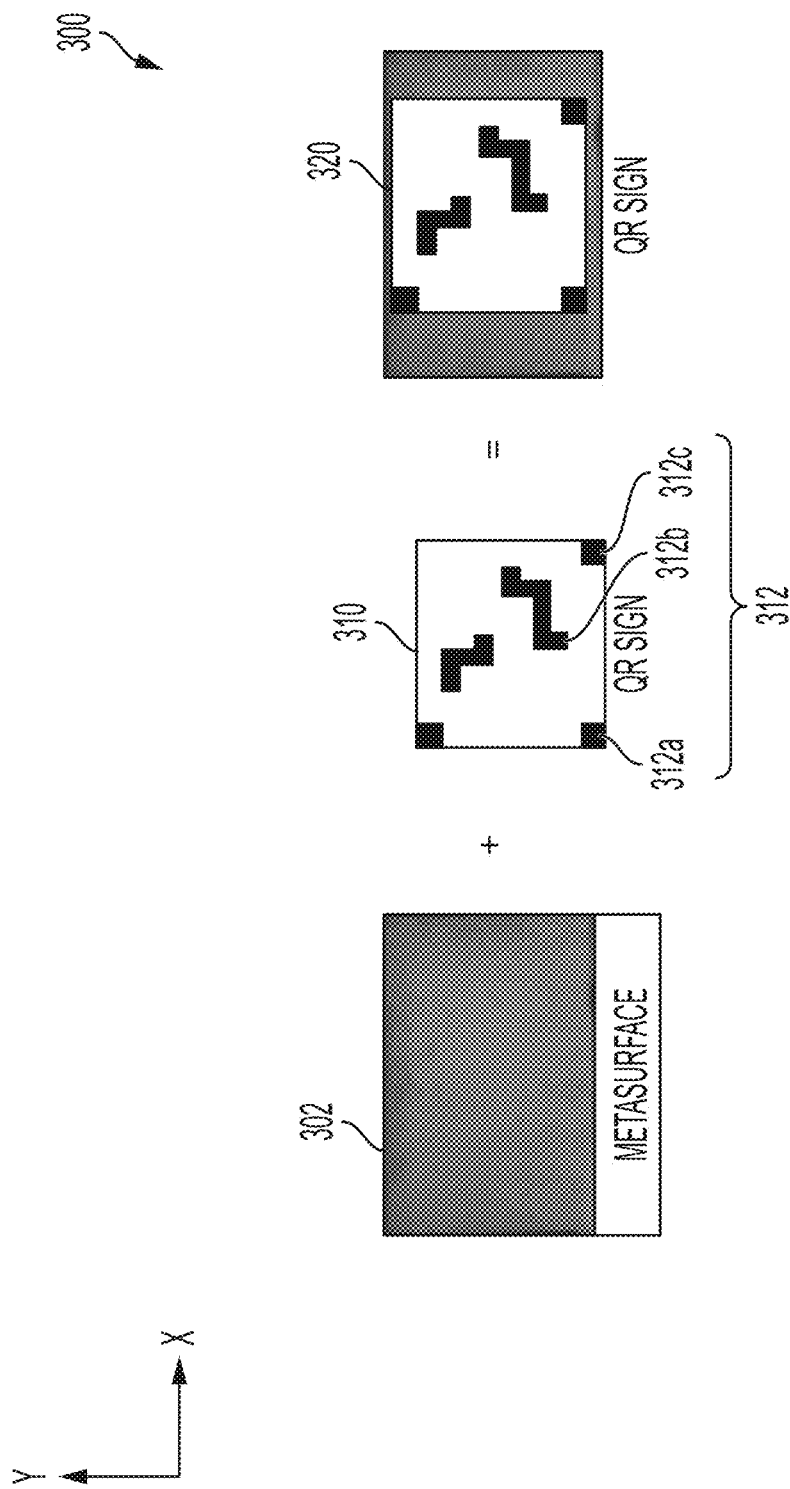
FIG. 3 is a diagram of a metasurface plate, in accordance with one or more embodiments.

FIG. 3 is a diagram of a metasurface plate, in accordance with one or more embodiments.

Metasurface plate 320 includes a metasurface portion 302 and a metasurface portion 310. Metasurface portion 302 corresponds to metasurface plate 200 of FIG. 2, and similar detailed description is therefore omitted.

Figure 4A:
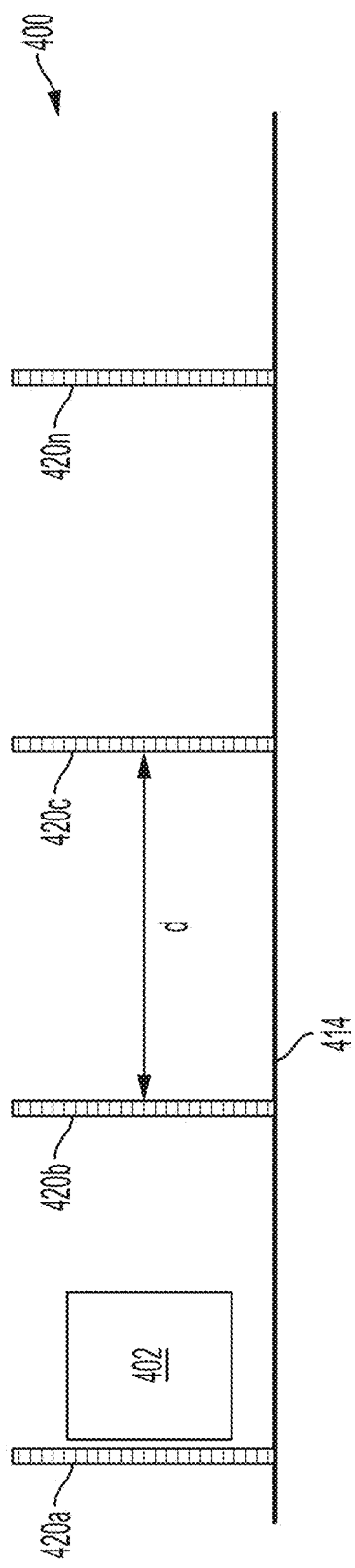
FIG. 4A is a side view of a guideway mounted vehicle, in accordance with one or more embodiments.
Figure 4B:
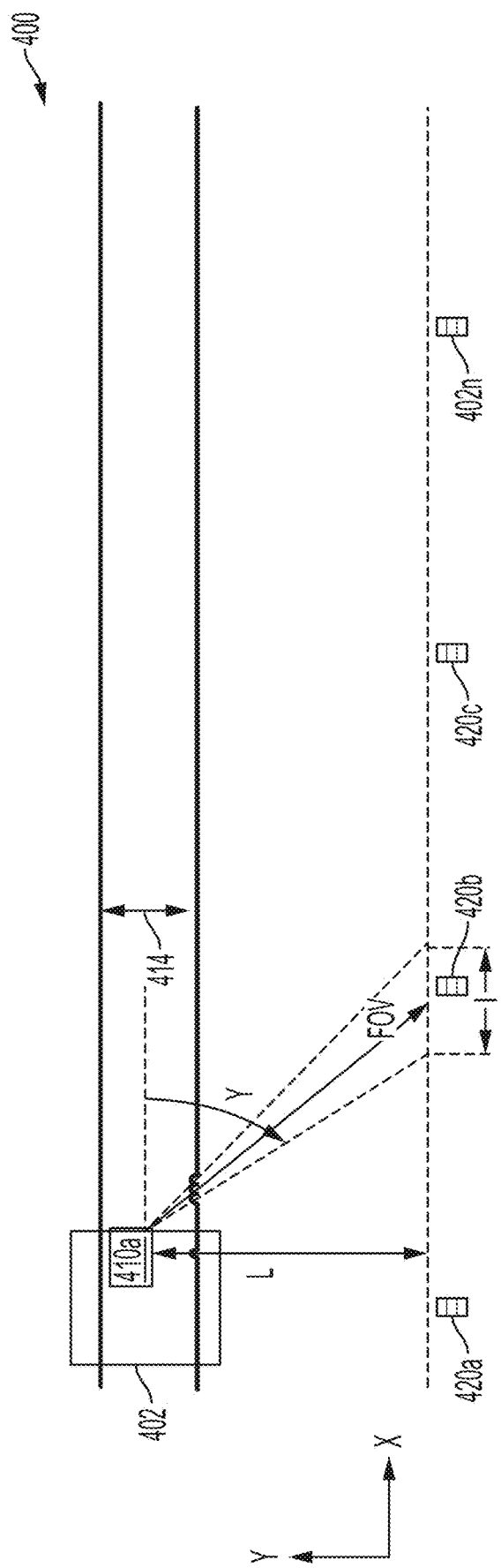
FIG. 4B is a top-side view of vehicle, in accordance with one or more embodiments.

In some embodiments, metasurface plate 320 is installed horizontally on the track bed as shown in FIGS. 5A-5B and 6A-6B or vertically on a sign post as shown in FIGS. 4A-4B.

Metasurface portion 302 is integrated with metasurface portion 310 in forming metasurface plate 320. Metasurface plate 320 creates an RF signature and another signature. For example, metasurface portion 302 generates an RF signature, and metasurface portion 310 generates another signature. In some embodiments, a size of metasurface plate 320 is about 30 cm by 30 cm. In some embodiments, a high bandwidth radar (e.g. bandwidth>10 GHz) is used to detect an RF signature of metasurface plate 320.

Metasurface portion 310 includes one or more retro reflecting elements 312a, 312b or 312c (collectively referred to as "set of retro reflecting elements 312") embedded in metasurface plate 320 to form a barcode, a quick response (QR) code, an image, or the like. In some embodiments, the image of metasurface portion 310 or the set of retro reflecting elements 312 are associated with a corresponding identification symbol that is used by controller 108 to identify a location of the metasurface plate 320.

In some embodiments, metasurface plate 320 creates two unique signatures (e.g., RF signature and another signature) detected by at least two sensors in the set of sensors 110 and 112 to localize vehicle 102 on guideway 114, and to provide a landmark vehicle 102 is aligned with if located at the platform (not shown) where vehicle 102 is expected to stop at.

In some embodiments, metasurface portion 302 generates an RF signature that can be detected by first sensor 110a or third sensor 112a, such as RADAR. In some embodiments, metasurface portion 310 generates another type of signature that can be detected by second sensor 110b or fourth sensor 112b, such as a camera or LiDAR.

In some embodiments, the corresponding signatures of metasurface portion 302 and metasurface portion 310 have corresponding identification symbols stored in a database of memory 904 that are each used to identify the position of metasurface plate 320.

In some embodiments, radar of first sensor 110a or third sensor 112a is configured to measure the range or distance to metasurface portion 302, and the camera or LiDAR of second sensor 110b or fourth sensor 112b is configured to detect the another signature of metasurface portion 310. In some embodiments, the another signature includes the range to metasurface portion 310 or the type of image. In some embodiments, the another signature is used to identify the metasurface plate 320 or the position of metasurface plate 320.

In some embodiments, the distance to the retroreflective element in metasurface plate 320 is determined by the radar of first sensor 110a or third sensor 112a, while second sensor 110b or fourth sensor 112b (e.g. camera, LiDAR or IR) are used to determine the identification symbol of the metasurface portion 310 with the range to metasurface portion 310 being calculated based on the image of metasurface portion 310.

In some embodiments, one or more of the size of the QR code, the size of the barcode, the camera's sensor resolution (e.g., pixels matrix) or the camera's lens field of view (FOV) are known by system 100. In these embodiments, controller 108 is configured to calculate the distance to metasurface portion 310, which is compared with the distance measured by the radar of sensors 110a, 112a.

In some embodiments, by combining metasurface portions 302 and 310 into metasurface plate 320, the corresponding generated or reflected signatures are used to increase the confidence in the range determination calculation and position determination of vehicle 102. In this embodiment, diverse detection is created decreasing the probability of a false positive or a false negative for detecting metasurface plate 320.

Other quantities, configurations or order of elements within metasurface plate 320 are within the scope of the present disclosure.

FIG. 4A is a side view of a guideway mounted vehicle 402, in accordance with one or more embodiments. Vehicle 402 comprises the features discussed with respect to vehicle 102 (FIG. 1). Vehicle 402 includes vehicle localization system 100 (FIG. 1), and is configured to move over guideway 414. Guideway 414 is a two-rail example of guideway 114 (FIG. 1). Markers 420a-420n, where n is an integer greater than 1, corresponding to markers 120 (FIG. 1). Markers 420a-420n are on the wayside of the guideway 414. In this example embodiment, markers 420a-420n are posts on the wayside of the guideway 414 separated by the distance d. In some embodiments, one or more of the markers 420a-420n or posts include metasurface plate 200, metasurface plate 302 or 320 or plate 320.

FIG. 4B is a top-side view of vehicle 402, in accordance with one or more embodiments. Vehicle 402 is configured to travel over guideway 414. Markers 420a-420n are on the wayside of the guideway 414. First sensor 410a corresponds to first sensor 110a (FIG. 1). First sensor 410a is positioned on the first end of vehicle 402 at a distance L from the markers 420a-420n. First sensor 410a is directed toward markers 420a-420n. Accordingly, first sensor 410a has an inclination angle γ that corresponds to inclination angle α1 (FIG. 1) of the first sensor 110a. First sensor 410a has a field of view FOV that corresponds to field of view 122a (FIG. 1). Based on the inclination angle γ, the field of view FOV, and the distance L, first sensor 410a has a detection span I. One of ordinary skill would recognize that the sensors of the first set of sensors 110 (FIG. 1) and the sensors of the second set of sensors 112 (FIG. 1) have properties similar to those discussed with respect to sensor 410a that vary based on the position of the sensor on the vehicle 102.

FIG. 5A is a top-side view of a guideway mounted vehicle 502, in accordance with one or more embodiments. Vehicle 502 comprises the features discussed with respect to vehicle 102 (FIG. 1). Vehicle 502 includes vehicle localization system 100 (FIG. 1), and is configured to move over guideway 514. Guideway 514 is a two-rail example of guideway 114 (FIG. 1). Markers 520a-520n, where n is an integer greater than 1, corresponding to markers 120 (FIG. 1). Markers 520a-520n are on the guideway 514. In this example embodiment, markers 520a-520n are railroad ties separated by the distance d. In some embodiments, one or more of the markers 520a-520n include metasurface plate 200, metasurface plate 302 or 320 or plate 310.

FIG. 5B is a side view of vehicle 502, in accordance with one or more embodiments. Vehicle 502 is configured to travel over markers 520a-520n. First sensor 510a corresponds to first sensor 110a (FIG. 1). First sensor 510a is positioned on the first end 504 of vehicle 502 at a distance L' from the guideway 514. First end 504 is first end 104 of vehicle 102, and second end 506 is second end 106 of vehicle 102. First sensor 510a is directed toward the guideway 514 to detect markers 520a-520n. Accordingly, first sensor 510a has an inclination angle γ that corresponds to inclination angle α1 (FIG. 1) of the first sensor 110a. First sensor 510a has a field of view FOV that corresponds to field of view 122a (FIG. 1). Based on the inclination angle γ, the field of view FOV, and the distance first sensor 510a has a detection span I. One of ordinary skill would recognize that the sensors of the first set of sensors 110 (FIG. 1) and the sensors of the second set of sensors 112 (FIG. 1) have properties similar to those discussed with respect to sensor 510a that vary based on the position of the sensor on the vehicle 102.

FIG. 6A is a side view of a system 600, in accordance with one or more embodiments. FIG. 6B is a top-side view of system 600, in accordance with one or more embodiments. FIG. 6C is a view of a curve 650, in accordance with one or more embodiments.

FIG. 6A is a variation of FIG. 5B, and FIG. 6B is a variation of FIG. 5A, in accordance with some embodiments.

In comparison with system 500 of FIGS. 5A-5B, system 600 of FIG. 6A includes a single marker (e.g., metasurface plate 620), and the sensor 510a is on the second end 506 of vehicle 502. For example, metasurface plate 620 replaces one of the markers of markers 520a-520n.

Vehicle 502 is configured to move over guideway 514 and metasurface plate 620. First sensor 510a is positioned on the second end 506 of vehicle 502. First sensor 510a is directed toward the guideway 514 to detect metasurface plate 620. Metasurface plate 620 is in the field of view FOV of first sensor 510a.

Vehicle 502 is separated from metasurface plate 620 by a distance D. In some embodiments, distance D is determined by controller 108 based on radar ranging information received from first sensor 110a or third sensor 112a. Metasurface plate 620 has a position $P_{plate}$ relative to the guideway 514. In some embodiments, the position $P_{plate}$ of metasurface plate 620 is determined based on the numerical value of metasurface plate 620 stored in a database (e.g., memory 904).

Vehicle 502 or first sensor 510a has a position $P_{vehicle}$ relative to the metasurface plate 620 that is calculated by equation 1 based on the position $P_{plate}$ of metasurface plate 620 relative to the guideway 514 and distance D. Vehicle 502 or first sensor 510a has a position $P_{vehicle}$ relative to the metasurface plate 620, as calculated by equation 1:

$$P_{vehicle} = P_{plate} - D \qquad (1)$$

In some embodiments, if metasurface plate 620 is located at a stopping location along the guideway 114, then distance D corresponds to the distance from the position $P_{vehicle}$ of vehicle 102 to the stopping location along guideway 114.

In some embodiments, if metasurface plate 620 is not located at a stopping location along the guideway 114, then distance D and the position of the position $P_{plate}$ of metasurface plate 620 are used by controller 108 to determine the distance from the position $P_{vehicle}$ of vehicle 102 to the stopping location along guideway 114.

Meta-surface 620 corresponds to meta-surface plate 200 or 320. Metasurface plate 620 includes the features discussed with respect to metasurface plate 200 or 320 (FIGS. 2-3). Metasurface plate 620 is on the guideway 514. In some embodiments, metasurface plate 620 is on the wayside of guideway 514 similar to FIGS. 4A-4B, but is not described herein for brevity.

In some embodiments, metasurface plate 620 includes at least one railroad tie. In some embodiments, metasurface plate 620 is positioned on a single railroad tie. In some embodiments, metasurface plate 620 is positioned on more than a single railroad tie.

Metasurface plate 620 includes n elements (collectively "metasurface elements E"), where n is an integer corresponding to the number of elements in metasurface plate 620. Metasurface elements E include one or more retro reflecting elements (e.g., E1 and E3 in FIGS. 6A-6B) that alternate with one or more absorbing elements (e.g., E2 in FIGS. 6A-6B). Metasurface plate 620 also includes diffused elements between adjacent absorbing elements and reflecting elements, but are not labeled for ease of illustration. In some embodiments, adjacent means directly next to.

Each of the metasurface elements E are separated from each other by at least a minimum distance Dmin. Minimum distance Dmin is dependent upon the bandwidth and frequency of the radar as shown in FIG. 6C. FIG. 6C is a view of a curve 650 of bandwidth versus discrimination distance in centimeters (cm), in accordance with one or more embodiments. For example, as shown in FIG. 6C, as the bandwidth or frequency of the radar increases, the discrimination or minimum distance Dmin decreases, and the metasurface elements E can be spaced closer to each other. Similarly, as the as shown in FIG. 6C, as the bandwidth or frequency of the radar decreases, the minimum distance Dmin increases, and the metasurface elements E are spaced further from each other. In some embodiments, if the metasurface elements are not separated by the minimum distance Dmin, then the radar sensor of first sensor 510*a* may not be able to accurately discern or detect one or more metasurface elements within metasurface plate 620 which would affect the determination of the position of metasurface plate 620.

Figures 7A, 7B, 7C:
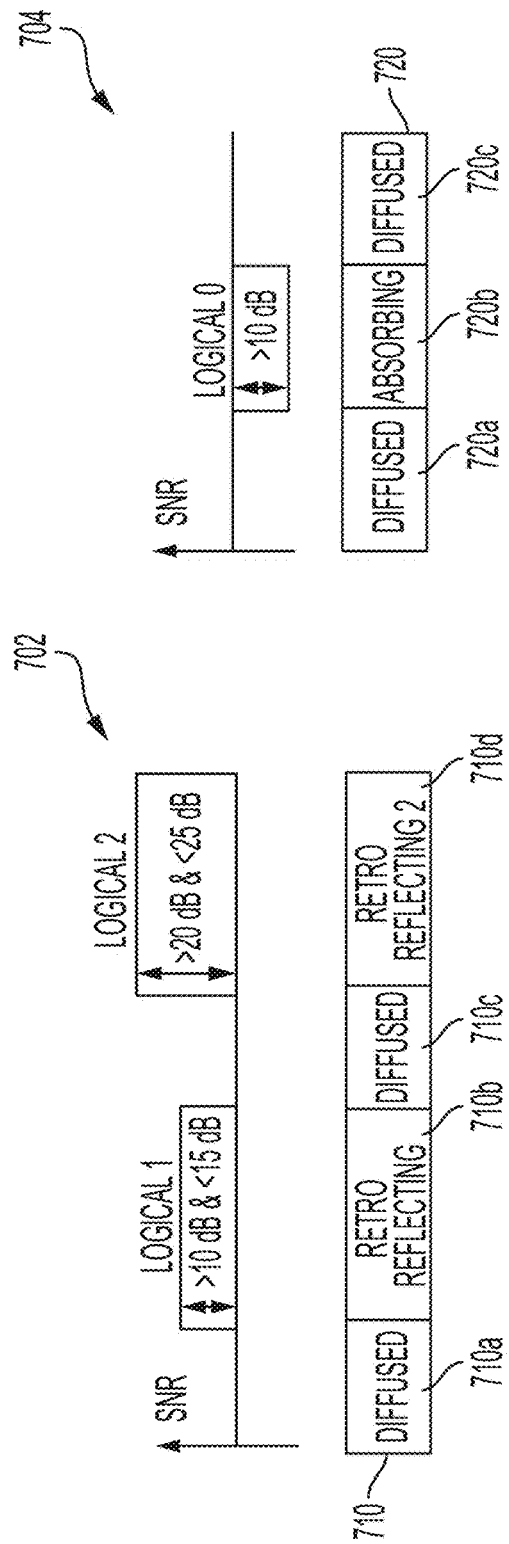
FIG. 7A is a view of an SNR profile generated by a metasurface plate, in accordance with one or more embodiments.
FIG. 7B is a view of an SNR profile generated by a metasurface plate, in accordance with one or more embodiments.
FIG. 7C is a view of an SNR profile generated by a metasurface plate, in accordance with one or more embodiments.

FIG. 7A is a view of an SNR profile 702 generated by a metasurface plate 710, in accordance with one or more embodiments.

FIG. 7B is a view of an SNR profile 704 generated by a metasurface plate 720, in accordance with one or more embodiments.

Metasurface plate 710 or 720 corresponds to metasurface plate 200, 320 or 802 (FIG. 8), and similar detailed description is therefore omitted.

Metasurface plate 710 includes diffused element 710*a*, retro reflecting element 710*b*, diffused element 710*c* and retro reflecting element 710*d*.

Metasurface plate 720 includes diffused element 720*a*, absorbing element 720*b* and diffused element 720*c*.

In some embodiments, metasurface plate 710 or 720 creates a unique RF signature detected by the radar of set of sensors 110 or 112. In some embodiments, the unique RF signature includes at least the SNR of the echo received from metasurface plate 710 or 720.

In some embodiments, the echo received from the retro reflecting element 710*b* has an SNR margin with respect to the echo received from diffused elements 710*a* and 710*c*. In some embodiments, the echo received from the retro reflecting element 710*s* has an SNR margin with respect to the echo received from diffused elements 710*a* and 710*c*.

In some embodiments, the echo received from absorbing element 720*b* has an SNR margin with respect to the echo received from diffused elements 720*a* and 720*c*.

In some embodiments, based on the SNR margin, the retro reflecting element or the absorbing element is associated with a corresponding symbol.

In some embodiments, if the SNR margin of the echo received from retro reflecting element 710*b* with respect to diffused elements 710*a* and 710*c* is greater than 10 DB and less than 15 DB, then the corresponding element of metasurface plate 710 is associated with a symbol having a logical value of "1". Thus, in these embodiments, retro reflecting element 710*b* is associated with a symbol having a logical value of "1".

In some embodiments, if the SNR margin of the echo received from retro reflecting element 710*d* with respect to diffused elements 710*a* and 710*c* is greater than 20 DB and less than 25 DB, then the corresponding element of metasurface plate 710 is associated with a symbol having a logical value of "2". Thus, in these embodiments, retro reflecting element 710*d* is associated with a symbol having a logical value of "2".

In some embodiments, if the SNR margin of the echo received from diffused elements 720*a* and 720*c* with respect to absorbing element 720*b* is greater than 10 DB, then the corresponding element of metasurface plate 710 is associated with a symbol having a logical value of "0". Thus, in these embodiments, absorbing element 720*b* is associated with a symbol having a logical value of "0".

In some embodiments, the logical values of symbols is based upon multilevel signaling. Other values of symbols or types of signaling are within the scope of the present disclosure.

In some embodiments, the echo received from retro reflecting elements 710*b* and 710*d* has an SNR margin (>20 dB) with respect to the echo received from absorbing element 720*b*, which is a sufficient margin for system 100 to accurately determine whether an absorbing element or a retro reflecting element was detected by first sensor 110*a* or third sensor 112*a*.

In some embodiments, based on the SNR margin detected by first sensor 110*a* or third sensor 112*a* of system 100, controller 108 can identify a location of metasurface plate 710 or 720.

In some embodiments, based on the SNR margin detected by first sensor 110*a* or third sensor 112*a* of system 100, controller 108 determines the corresponding symbols associated with the corresponding SNR margins, and then determines the position of metasurface plate 710 or 720 from the symbols or a numerical value calculated from the symbol.

In some embodiments, each metasurface plate 200, 320, 710, 720, 730 or 802 of system 100 can be identified based on an order of a sequence of symbols. In some embodiments, the order of the sequence of symbols is unique.

In some embodiments, based on the SNR margin, the retro reflecting element and the absorbing element are associated with corresponding symbols. In some embodiments, the symbol values are a design choice based on the number of elements in metasurface plates in system 100. For example, as the number of unique metasurface plates increases, the number of symbols also increases. Similarly, as the number of unique metasurface plates decreases, the number of symbols also decreases.

In some embodiments, the SNR's of each element in metasurface plate 200, 320, 710, 720, 730 or 802 are associated with a corresponding identification symbol or corresponding plate element that is used by controller 108 to identify a location of metasurface plate 200, 320, 710, 720, 730 or 802.

Other SNR values of echo signals received from elements within the set of diffused elements 202, set of retro reflecting elements 204 or set of absorbing elements 206 are within the scope of the present disclosure.

FIG. 7C is a view of an SNR profile 706 generated by a metasurface plate 730, in accordance with one or more embodiments.

FIG. 7C is a variation of FIGS. 7A-7B, in accordance with some embodiments.

Metasurface plate 730 corresponds to metasurface plate 200, 320 or 802 (FIG. 8), and similar detailed description is therefore omitted.

Metasurface plate 730 includes diffused element 730*a*, retro reflecting element 730*b*, diffused element 730*c*, absorbing element 730*d* and diffused element 730*e*.

In some embodiments, metasurface plate 730 creates a unique RF signature (shown in FIG. 7C) detected by the radar of set of sensors 110 or 112. In some embodiments, the unique RF signature includes at least the SNR of the echo received from metasurface plate 730.

In some embodiments, the unique RF signature of FIG. 7C is used to identify a start position or an end position of a metasurface plate (e.g., metasurface plate 200, 320 or 802).

In some embodiments, controller 108 is configured to determine which of the first end 104 or the second end 106 of vehicle 102 is the leading end of vehicle 102 as vehicle 102 moves along guideway 114.

For example, in some embodiments, controller 108 is configured to receive SNR values (as shown in FIG. 7C) from first sensor 110*a* or third sensor 112*a*. In some embodiments, from the SNR values, controller 108 is configured to determine a sequence of symbols or a sequence of elements within metasurface plate 730. In some embodiments, from the sequence of symbols, controller 108 is configured to determine or a sequence of elements within metasurface plate 730. In some embodiments, from one or more of the order of SNR values, order of the sequence of symbols or order of the sequence of elements within metasurface plate 730, controller 108 is configured to determine the leading end of vehicle 102 or trailing end of vehicle 102 as vehicle 102 moves along guideway 114.

For example, if vehicle 102 is moving in the GD0 or first direction 116, controller 108 would expect to sense metasurface 730 to have corresponding SNRs of diffused element 730a, retro reflecting element 730b, diffused element 730c, absorbing element 730d and diffused element 730e. Thus, based on a determination by controller 108 that the metasurface sequence is "diffused element 730a-retro reflecting element 730b-diffused element 730c-absorbing element 730d-diffused element 730e", controller 108 determines that the first end 104 of vehicle 102 is the leading end of vehicle 102.

In some embodiments, if vehicle 102 is moving in the GD0 or first direction 116, controller 108 would expect to sense a sequence of symbols in order "1" and "0". Thus, based on a determination by controller 108 that the symbol sequence is "10", controller 108 determines that the first end 104 of vehicle 102 is the leading end of vehicle 102.

For example, if vehicle 102 is moving in the GD1 or second direction 118, controller 108 would expect to sense metasurface 730 to have corresponding SNRs of diffused element 730e, absorbing element 730d, diffused element 730c, retro reflecting element 730b and diffused element 730a. Thus, based on a determination by controller 108 that the metasurface sequence is "diffused element 730e-absorbing element 730d-diffused element 730c-retro reflecting element 730b-diffused element 730a," controller 108 determines that the first end 104 of vehicle 102 is the leading end of vehicle 102.

In some embodiments, if vehicle 102 is moving in the GD1 or second direction 118, controller 108 would expect to sense a sequence of symbols in order "0" and "1". Thus, based on a determination by controller 108 that the symbol sequence is "01", controller 108 determines that the second end 106 of vehicle 102 is the leading end of vehicle 102.

In some embodiments, the elements of metasurface 730 are used to identify a start position and an end position of each metasurface plate. In other words, metasurface plate 730 is used to identify a beginning portion (e.g., portion 804) and an end portion (e.g., portion 808) of each metasurface plate (e.g., metasurface plate 802) in system 100.

In some embodiments, the order of the elements within metasurface plate 730, the order of SNR values associated with the corresponding elements of metasurface plate 730, or the order of the sequence of symbols associated with the corresponding elements of metasurface plate 730 of FIG. 7C is used to identify a start position or an end position of each metasurface plate (e.g., metasurface plate 200, 320 or 802) in system 100.

Other SNR sequences, symbol sequences or metasurface element sequences to identify a start position or an end position of each metasurface plate are within are within the scope of the present disclosure.

Figure 8:
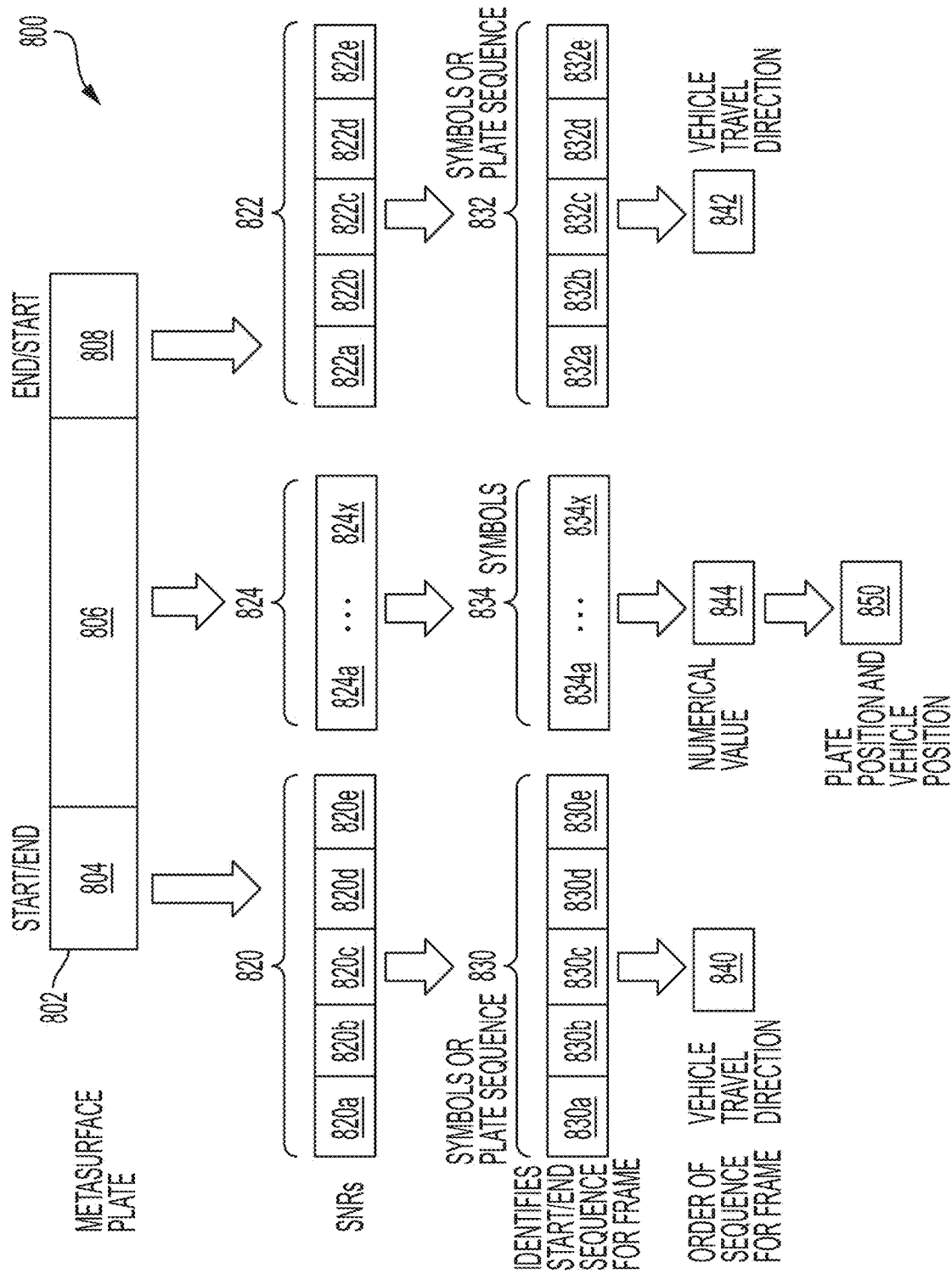
FIG. 8 is a view of fields of data associated with a metasurface plate, in accordance with one or more embodiments.

FIG. 8 is a view of fields of data associated with a metasurface plate 802, in accordance with one or more embodiments.

Metasurface plate 802 corresponds to metasurface plate 200, 320, 710, 720 or 730, and similar detailed description is therefore omitted.

Metasurface plate 802 includes a portion 804, portion 806 and portion 808. Portion 806 is positioned between portion 804 and 808. In some embodiments, at least portion 804 or portion 808 corresponds to metasurface plate 730, and similar detailed description is therefore omitted. Portion 804 is used by controller 108 to identify a beginning portion of metasurface plate 802. Portion 806 is used by controller 108 to identify an end portion of metasurface plate 802.

In some embodiments, controller 108 is configured to determine a start point of the metasurface plate 802 based on a sequence of symbols 830 associated with portion 804 of metasurface plate 802, and determine an end point of the metasurface plate 802 based on the sequence of symbols 832 associated with portion 808 of metasurface plate 802.

In some embodiments, the controller 108 is configured to determine a leading end of vehicle 102 and a trailing end of vehicle 102 based on an order of the sequence of symbols 830 associated with portion 804 of metasurface plate 802 or portion 808 of metasurface plate 802.

In some embodiments, portion 806 is used by controller 108 to identify a corresponding position of metasurface plate 802 on guideway 114.

Portion 804 is used by controller 108 to identify a start or end position of metasurface plate 802 dependent upon the travel direction of vehicle 102.

Portion 804 includes a set of metasurface elements (not shown) similar to metasurface plate 730. Portion 804 is associated with corresponding set of SNRs 820.

Set of SNRs 820 includes one or more of SNR 820a, 820b, 820c, 820d or 820e. In some embodiments, each of the metasurface elements (not shown) within portion 804 is associated with corresponding SNR 820a, 820b, 820c, 820d or 820e.

Set of SNRs 820 is associated with set of symbols or plates 830. Set of symbols or plates 830 includes one or more of symbols or plates 830a, 830b, 830c, 830d or 830e. In some embodiments, each of SNR 820a, 820b, 820c, 820d or 820e of the set of SNRs 820 has a corresponding sequence of symbols or plates 830a, 830b, 830c, 830d or 830e. In some embodiments, set of symbols 830 is similar to a header or a footer of a sequence of data.

In some embodiments, from the set of symbols or plates 830, controller 108 is configured to determine vehicle travel direction 840. In some embodiments, vehicle travel direction 840 corresponds to the leading end of vehicle 102 or trailing end of vehicle 102 as vehicle 102 moves along guideway 114.

Portion 806 is used by controller 108 to identify a start or end position of metasurface plate 802 dependent upon the travel direction of vehicle 102.

Portion 806 includes a set of metasurface elements (not shown) similar to metasurface plate 730. Portion 806 is associated with corresponding set of SNRs 822.

Set of SNRs 822 includes one or more of SNR 822a, 822b, 822c, 822d or 822e. In some embodiments, each of the metasurface elements (not shown) within portion 806 is associated with corresponding SNR 822a, 822b, 822c, 822d or 822e.

Set of SNRs 822 is associated with set of symbols or plates 832. Set of symbols or plates 832 includes one or more of symbols or plates 832a, 832b, 832c, 832d or 832e. In some embodiments, each of SNR 822a, 822b, 822c, 822d or 822e of the set of SNRs 822 has a corresponding sequence of symbols or plates 832a, 832b, 832c, 832d or 832e. In some embodiments, set of symbols 832 is similar to a header or a footer of a sequence of data.

In some embodiments, from the set of symbols or plates 832, controller 108 is configured to determine vehicle travel direction 842. In some embodiments, vehicle travel direction 842 corresponds to the leading end of vehicle 102 or trailing end of vehicle 102 as vehicle 102 moves along guideway 114. Vehicle travel direction 842 is equal to vehicle travel direction 840.

In some embodiments, portion 806 is used by controller 108 to identify a corresponding position of metasurface plate 802 on guideway 114.

Portion 806 includes a set of metasurface elements (not shown) similar to metasurface plate 200, 320, 710, 720 or 730. Portion 804 is associated with corresponding set of SNRs 824.

Set of SNRs 824 includes one or more of SNR 824a, 824b, 824c, 824d or 824e. In some embodiments, each of the metasurface elements (not shown) within portion 804 is associated with corresponding SNR 824a, 824b, 824c, 824d or 824e.

Set of SNRs 824 is associated with set of symbols 834. Set of symbols 834 includes one or more of symbols 834a, 834b, 834c, 834d or 834e. In some embodiments, each of SNR 824a, 824b, 824c, 824d or 824e of the set of SNRs 824 has a corresponding sequence of symbols 834a, 834b, 834c, 834d or 834e.

Set of symbols 834 is associated with a numerical value 844. In some embodiments, controller 108 is configured to calculate the numerical value 844 associated with portion 806 of metasurface plate 802 based on the set of symbols 834, with the least significant element as the first element in the $GD_0$ direction and the most significant element as the last element in the $GD_0$ direction.

For example, if vehicle 102 is moving in the GD1 direction, and 5 elements are sequentially detected with the following logical values: E1=1, E2=2, E3=0, E4=2, E5=0. In this example, controller 108 calculates numerical value 844 as:

Numerical value=$E5=0\times 3^0 + E4=2\times 3^1 + E3=0\times 3^2 + E2=2\times 3^3 + E1=1\times 3^4 = 141$.

For example, if vehicle 102 is moving in the $GD_0$ direction, and 5 elements are sequentially detected with the following logical values: E1=0, E2=2, E3=0, E4=2, E5=1. In this example, controller 108 calculates numerical value 844 as:

Numerical value=$E1=0\times 3^0 + E2=2\times 3^1 + E3=0\times 3^2 + E4=2\times 3^3 + E5=1\times 3^4 = 141$.

Therefore, in this example, the numerical value 844 calculated by controller 108 is not sensitive to the direction of travel. Other approaches to determining numerical value 844 are within the scope of the present disclosure.

Plate position 850 is associated with numerical value 844. In some embodiments, controller 108 is configured to determine plate position 850 based on numerical value 844 stored in the database (e.g., memory 904).

In some embodiments, based on the numerical value 844 of metasurface plate 802, the plate reference position 850 on guideway 114 is determined by controller 108 according to a database (e.g., memory 904).

In some embodiments, the plate reference position 850 is $P_{plate}$ of equation 1. In some embodiments, the plate reference position 850 corresponds to the position of the end retro reflective element in portion 804 or portion 808.

In some embodiments, the vehicle reference position $P_{vehicle}$ on guideway 114 is determined based on the plate reference position 850. In some embodiments, the vehicle reference position $P_{vehicle}$ on guideway 114 is determined by controller 108, and is expressed by equation 1.

Figure 9:
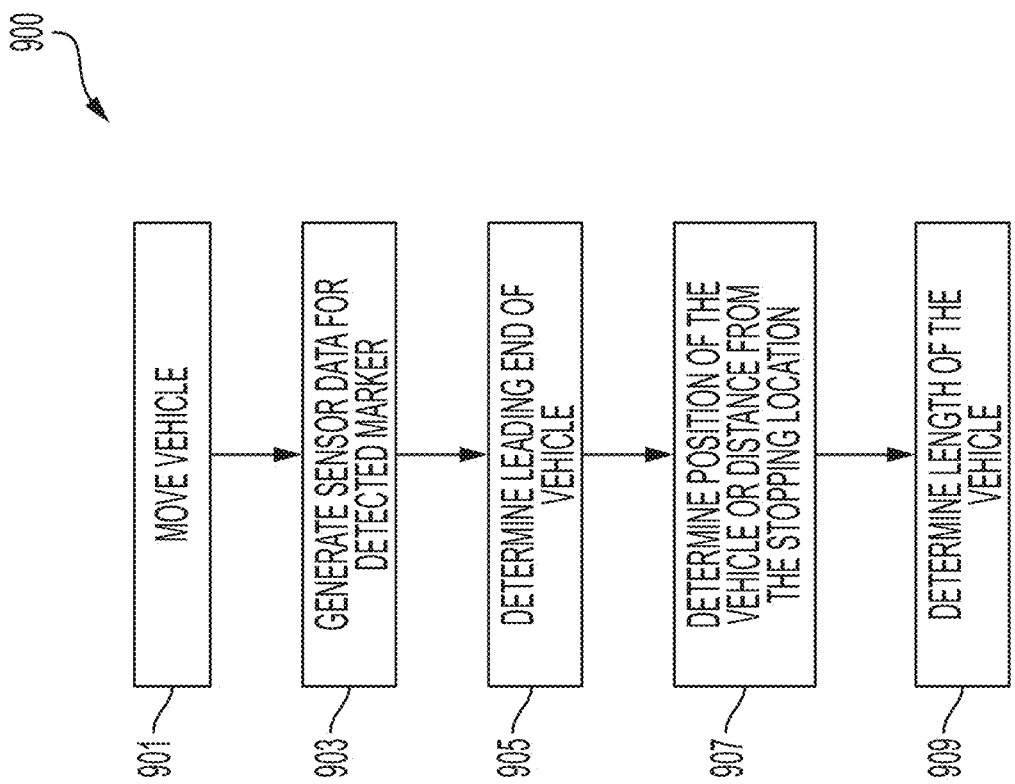
FIG. 9 is a flowchart of a method of determining a position of a vehicle on a guideway and a distance from the position of the vehicle to a stopping location along the guideway, and the length of the vehicle in accordance with one or more embodiments.

FIG. 9 is a flowchart of a method 900 of determining a position of a vehicle on a guideway and a distance from the position of the vehicle to a stopping location along the guideway, in accordance with one or more embodiments. In some embodiments, one or more steps of method 900 is implemented by a controller such as controller 108 (FIG. 1).

In step 901, the vehicle moves from a start position such as a known or a detected marker in one of a first direction or a second direction.

In step 903, one or more sensors generate sensor data based on a detection of a marker of a set of markers using a set of sensors on the first end or on the second end of the vehicle. Each sensor of the set of sensors on the first end or the second end of the vehicle is configured to generate corresponding sensor data. In some embodiments, the sensors detect a pattern of objects on a guideway along which the vehicle moves, and the controller recognizes the pattern of objects as the detected marker of the set of markers based on data stored in a memory comprising information describing the detected marker of the set of markers.

In some embodiments, step 903 further includes at least step 903a or step 903b.

In some embodiments, step 903a includes detecting, by a first sensor, an RF signature of at least a marker. In some embodiments, the first sensor is on a first end 104 of the vehicle 102 along the guideway 114, and is a radar detection device. In some embodiments, the marker is a metasurface plate 200, 302, 320, 710, 720, 730, 802 including at least a first retroreflector element.

In some embodiments, step 903a further includes transmitting an RF signal from the first sensor towards the metasurface plate, and receiving, by the first sensor, a reflected RF signal from the metasurface plate. In some embodiments, the reflected RF signal has the corresponding RF signature that identifies the position of the vehicle.

In some embodiments, step 903b includes detecting, by a second sensor, another signature of at least the marker. In some embodiments, the another signature of at least the marker is another RF signature. In some embodiments, the second sensor is on the first end 104 of the vehicle 102 or the second end 106 of the vehicle 102 opposite from the first end 104 of the vehicle 102. In some embodiments, the second sensor is another radar detection device, a camera, a LIDAR device or an IR sensor detection device.

In some embodiments, step 903b further includes transmitting another signal from the second sensor towards the metasurface plate, and receiving, by the second sensor, a reflected another signal from the metasurface plate. In some embodiments, the another signature has a corresponding signature that identifies the position of the vehicle.

In step 905, the controller 108 determines the leading end of the vehicle, and the trailing end of the vehicle. In some embodiments, determining the leading end of the vehicle or the trailing end of the vehicle of step 905 is similar to the description in at least FIG. 7A-7C or 8, and similar detailed description is therefore omitted.

In some embodiments, step 905 further includes the controller 108 determining a start point of the metasurface plate 802 based on a sequence of symbols associated with a first portion 804 of the metasurface plate, and determining an end point of the metasurface plate 802 based on the sequence of symbols associated with a second portion 808 of the metasurface plate 802. In some embodiments, determining the starting point or end point of the vehicle of step 905 is similar to the description in at least FIG. 7A-7C or 8, and similar detailed description is therefore omitted.

In step 907, the controller determines a position of the vehicle on the guideway based on information received from at least the first sensor or the second sensor. In some embodiments, the information includes the RF signature and the another signature.

In some embodiments, step 907 includes the controller determining a distance from the position of the vehicle to a stopping location along the guideway based on the information received from the first sensor or the second sensor, the marker being located at the stopping location.

In some embodiments, calculating a position of the vehicle of step 907 includes calculating one or more of a position of the leading end of the vehicle based on the sensor data generated by one or more of the first sensor or the second sensor, or calculating a position of the end of the vehicle that is other than the leading end of the vehicle based on the position of the leading end of the vehicle and a length of the vehicle.

In some embodiments, step 907 further includes measuring a set of SNRs (820, 822 and 824) based on the corresponding received RF signal from the metasurface plate 802, determining a symbol sequence (830, 832, 834) of the corresponding metasurface plate from the set of SNRs (820, 822 and 824) of the corresponding metasurface plate 802 (e.g., 804, 808, 806), identifying a beginning portion 804 of the metasurface plate 802 and an end portion 808 of the metasurface plate 802 based on the symbol sequence (830, 832, 834) of the corresponding metasurface plate, determining a numerical value 844 of a middle portion 806 of the metasurface plate 802 based on the corresponding symbol sequence 824 of the middle portion 806 of the metasurface plate 802, determining a metasurface reference position 850 based on the numerical value 844 of the corresponding middle portion 806 of the metasurface plate 802, determining a distance D (equation 1) from the first sensor or the second sensor to the metasurface plate 802, and determining the position $P_{vehicle}$ of the vehicle from the metasurface reference position 850 and the distance D (equation 1) from the first sensor or the second sensor to the metasurface plate.

In some embodiments, if metasurface plate 802 is located at the stopping location, then distance D (equation 1) of step 907 corresponds to the distance from the stopping location. In some embodiments, step 907 is similar to the description in at least FIG. 7A-7C or 8, and similar detailed description is therefore omitted.

In step 909, the controller determines a length of the vehicle from the speed of the vehicle and a time value T.

In some embodiments, the length $L_V$ of the vehicle is equal to the speed $V_{vehicle}$ of the vehicle multiplied by time value T, as expressed by equation 2.

$$L_V = V_{vehicle} * T$$

In some embodiments, the time value T is the difference between time T1 when the sensor installed on the vehicle's leading end passes the starting point of the metasurface plate 802, and time T2, when the sensor installed on the vehicle's trailing end passes the starting point of metasurface plate 802. In some embodiments, the time value T is the difference between time T1 when the sensor installed on the vehicle's leading end passes the end point of the metasurface plate 802, and time T2, when the sensor installed on the vehicle's trailing end passes the end point of metasurface plate 802.

In some embodiments, the speed $V_{vehicle}$ of the vehicle is determined by radar sensor of the first set of sensors were the second set of sensors.

Figure 10:
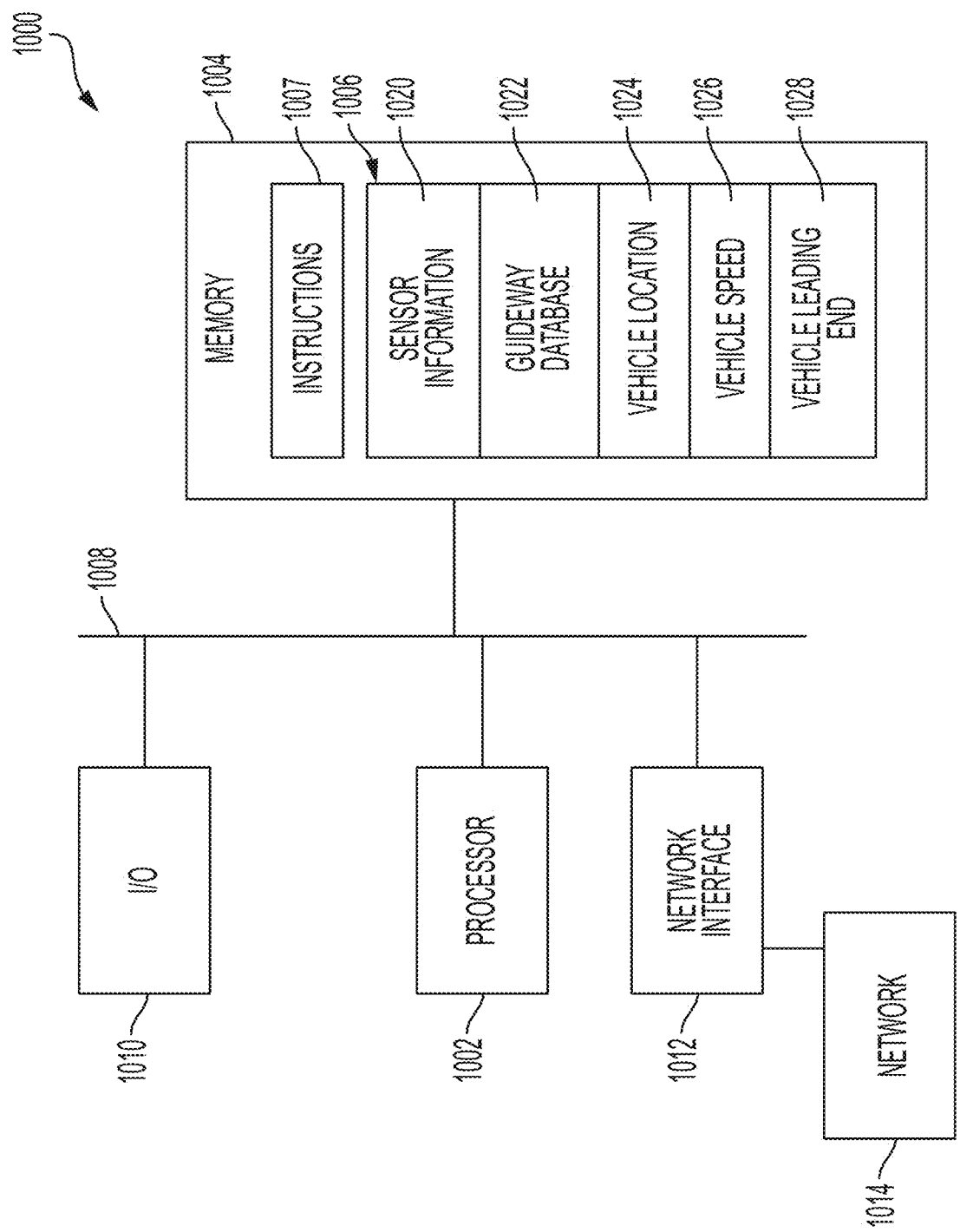
FIG. 10 is a block diagram of a vehicle on board controller ("VOBC"), in accordance with one or more embodiments.

FIG. 10 is a block diagram of a vehicle on board controller ("VOBC") 1000, in accordance with one or more embodiments. VOBC 1000 is usable in place of one or more of controller 108 (FIG. 1), alone or in combination with memory 109 (FIG. 1). VOBC 1000 includes a specific-purpose hardware processor 1002 and a non-transitory, computer readable storage medium 1004 encoded with, i.e., storing, the computer program code 1006, i.e., a set of executable instructions. Computer readable storage medium 1004 is also encoded with instructions 1007 for interfacing with vehicle 102. The processor 1002 is electrically coupled to the computer readable storage medium 1004 via a bus 1008. The processor 1002 is also electrically coupled to an I/O interface 1010 by bus 1008. A network interface 1012 is also electrically connected to the processor 1002 via bus 1008. Network interface 1012 is connected to a network 1014, so that processor 1002 and computer readable storage medium 1004 are capable of connecting to external elements via network 1014. The processor 1002 is configured to execute the computer program code 1006 encoded in the computer readable storage medium 1004 in order to cause controller 1000 to be usable for performing a portion or all of the operations as described in method 900.

In some embodiments, the processor 1002 is a central processing unit (CPU), a multi-processor, a distributed processing system, an application specific integrated circuit (ASIC), and/or a suitable processing unit.

In some embodiments, the computer readable storage medium 1004 is an electronic, magnetic, optical, electromagnetic, infrared, and/or a semiconductor system (or apparatus or device). For example, the computer readable storage medium 1004 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 1004 includes a compact disk-read only memory (CD-ROM), a compact disk-read/write (CD-R/W), and/or a digital video disc (DVD).

In some embodiments, the storage medium 1004 stores the computer program code 1006 configured to cause system 1000 to perform method 900. In some embodiments, the storage medium 1004 also stores information needed for performing method 900 as well as information generated during performing the method 900 such as a sensor information parameter 1020, a guideway database parameter 1022, a vehicle location parameter 1024, a vehicle speed parameter 1026, a vehicle leading end parameter 1028, and/or a set of executable instructions to perform the operation of method 900.

In some embodiments, the storage medium 1004 stores instructions 1007 to effectively implement method 900.

VOBC 1000 includes I/O interface 1010. I/O interface 1010 is coupled to external circuitry. In some embodiments, I/O interface 1010 includes a keyboard, keypad, mouse, trackball, trackpad, and/or cursor direction keys for communicating information and commands to processor 1002.

VOBC 1000 also includes network interface 1012 coupled to the processor 1002. Network interface 1012 allows VOBC 1000 to communicate with network 1014, to which one or more other computer systems are connected. Network interface 1012 includes wireless network interfaces such as BLUETOOTH, WIFI, WIMAX, GPRS, or WCDMA; or wired network interface such as ETHERNET, USB, or IEEE-1394. In some embodiments, method 900 is implemented in two or more VOBCs 1000, and information such as memory type, memory array layout, I/O voltage, I/O pin location and charge pump are exchanged between different VOBCs 1000 via network 1014.

VOBC 1000 is configured to receive sensor information. The information is stored in computer readable medium 1004 as sensor information parameter 1020. VOBC 1000 is configured to receive information related to the guideway database through I/O interface 1010 or network interface 1012. The information is stored in computer readable medium 1004 as guideway database parameter 1022. VOBC 1000 is configured to receive information related to vehicle location through I/O interface 1010 or network interface 1012. The information is stored in computer readable medium 1004 as vehicle location parameter 1024. VOBC 1000 is configured to receive information related to vehicle speed through I/O interface 1010 or network interface 1012. The information is stored in computer readable medium 1004 as vehicle speed parameter 1026.

During operation, processor 1002 executes a set of instructions to determine the location and speed of the guideway mounted vehicle, which are used to update vehicle location parameter 1024 and vehicle speed parameter 1026. Processor 1002 is further configured to receive LMA instructions and speed instructions from a centralized or de-centralized control system. Processor 1002 determines whether the received instructions are in conflict with the sensor information. Processor 1002 is configured to generate instructions for controlling an acceleration and braking system of the guideway mounted vehicle to control travel along the guideway.

An aspect of this description relates to a system. The system comprises a first sensor on a first end of a vehicle and an on-board controller coupled to the first sensor. The first sensor is configured to detect a radio frequency (RF) signature of a marker along a guideway. The first sensor is a radar detection device. The on-board controller is configured to determine a first position of the vehicle on the guideway or a first distance from the position of the vehicle to a stopping location along the guideway based on at least the RF signature received from the first sensor. The marker is a metasurface plate comprising a first diffused element, a first retroreflector element, a first absorbing element and a second diffused element between the first retroreflector element and the first absorbing element.

Another aspect of this description relates a system. The system comprises a marker along a guideway, a first sensor, a second sensor and an on-board controller.

The marker includes a metasurface plate comprising a first portion having a first retroreflector element, a second portion having a second retroreflector element and a third portion having a third retroreflector element. The first sensor is on a first end of a vehicle, and configured to detect a radio frequency (RF) signature of the marker. The first sensor is a radar detection device. The second sensor is on the first end of the vehicle, and configured to detect another signature of the marker. The second sensor is a camera, a LIDAR device or an IR sensor detection device. The on-board controller is coupled to the first sensor and the second sensor, and configured to determine a position of the vehicle on the guideway or a distance from the position of the vehicle to a stopping location along the guideway based on information received from the first sensor and the second sensor. The information includes the RF signature and the another signature.

Yet another aspect of this description relates to a method comprising detecting, by a first sensor, a radio frequency (RF) signature of at least a marker, the first sensor being on a first end of a vehicle along a guideway, and being a radar detection device, and the marker being a metasurface plate including at least a first retroreflector element. The method further includes detecting, by a second sensor, another signature of at least the marker, the second sensor being on the first end of the vehicle or a second end of the vehicle opposite from the first end of the vehicle, and the second sensor being another radar detection device, a camera, a LIDAR device or an IR sensor detection device. The method further includes determining, by an on-board controller, at least a position of the vehicle on the guideway based on information received from at least the first sensor or the second sensor, or a distance from the position of the vehicle to a stopping location along the guideway based on the information received from the first sensor or the second sensor, the marker being located at the stopping location, the information including the RF signature and the another signature.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A system comprising:
   a first sensor on a first end of a vehicle, and configured to detect a radio frequency (RF) signature of a marker along a guideway, wherein the first sensor is a radar detection device; and
   an on-board controller coupled to the first sensor, and configured to determine a first position of the vehicle on the guideway or a first distance from the first position of the vehicle to a stopping location along the guideway based on at least the RF signature received from the first sensor;
   wherein the marker is a metasurface plate comprising:
      a first diffused element;
      a second diffused element;
      a third diffused element;
      a first retroreflector element between the first diffused element and the second diffused element; and
      a first absorbing element between the second diffused element and the third diffused element.

2. The system of claim 1, wherein the system further comprises:
   a second sensor on a second end of the vehicle, and configured to detect another radio frequency (RF) signature of the marker along the guideway,
   wherein the second sensor is another radar detection device,
   the second end of the vehicle is opposite from the first end of the vehicle, and
   the on-board controller is further coupled to the second sensor, and further configured to determine a second position of the vehicle on the guideway or a second distance from the second position of the vehicle to the stopping location along the guideway based on the another RF signature received from the second sensor.

3. The system of claim 2, wherein
   the marker is located at the stopping location; and
   the on-board controller is further configured to:
      compare the first distance with the second distance;
      determine that the first sensor and the second sensor are not faulty, if the first distance does not differ by more than a predefined tolerance from the second distance; and determine that one of the first sensor or the second sensor is faulty, if the first distance differs by more than the predefined tolerance from the second distance.

4. The system of claim 2, wherein the on-board controller is further configured to:
compare the first position with the second position;
determine that the first sensor and the second sensor are not faulty, if the first position does not differ by more than a predefined tolerance from the second position; and
determine that one of the first sensor or the second sensor is faulty, if the first position differs by more than the predefined tolerance from the second position.

5. The system of claim 2, wherein the on-board controller is further configured to determine a length of the vehicle comprising:
determining a relative velocity of the vehicle between the first sensor or the second sensor and the marker;
determining a first time the first sensor of the vehicle passes a first portion of the marker;
determining a second time the second sensor of the vehicle passes the first portion of the marker, the first portion of the marker being a starting point of the metasurface plate or an ending point of the metasurface plate;
determining a time difference from the first time and the second time; and
determining the length of the vehicle based on the time difference and the relative velocity of the vehicle.

6. The system of claim 1, wherein the on-board controller is further configured to:
determine a start point of the metasurface plate based on a first sequence of symbols associated with a first portion of the metasurface plate; and
determine an end point of the metasurface plate based on a second sequence of symbols associated with a second portion of the metasurface plate.

7. The system of claim 6, wherein the on-board controller is further configured to:
determine a leading end of the vehicle and a trailing end of the vehicle based on an order of the sequence of symbols associated with the first portion of the metasurface plate or the second portion of the metasurface plate.

8. The system of claim 1, wherein the on-board controller is further configured to determine at least one of the following:
a distance from the first sensor to the marker;
a relative velocity of the vehicle between the first sensor and the marker; or
an angular position of the first sensor relative to the marker.

9. The system of claim 1, wherein the metasurface plate further comprises:
a fourth diffused element;
a fifth diffused element;
a sixth diffused element;
a second absorbing element between the fifth diffused element and the sixth diffused element; and
a second retroreflector element between the fourth diffused element and the fifth diffused element;
wherein the first diffused element is on a first end of the metasurface plate, and the sixth diffused element is on a second end of the metasurface plate opposite the first end of the metasurface plate.

10. The system of claim 1, wherein the vehicle is configured to move along the guideway, and the marker is on the guideway.

11. The system of claim 1, wherein the vehicle is configured to move along the guideway, and the marker is on a wayside of the guideway.

12. The system of claim 1, wherein the first sensor is configured to measure an echo signal from the metasurface plate, and the RF signature includes a set of signal to noise ratios (SNRs) of the echo signal.

13. A system comprising:
a marker along a guideway, the marker including a metasurface plate comprising:
a first portion having a first retroreflector element;
a second portion having a second retroreflector element;
a third portion having a third retroreflector element;
a first absorbing element between the first retroreflector element and the second retroreflector element; and
a first diffused element between the first retroreflector element and the first absorbing element;
a first sensor on a first end of a vehicle, and configured to detect a radio frequency (RF) signature of the marker, wherein the first sensor is a radar detection device;
a second sensor on the first end of the vehicle, and configured to detect another signature of the marker, wherein the second sensor is a camera, a laser imaging detection and ranging (LIDAR) device or an infrared radiation (IR) sensor detection device; and
an on-board controller coupled to the first sensor and the second sensor, and configured to determine a position of the vehicle on the guideway or a distance from the position of the vehicle to a stopping location along the guideway based on information received from the first sensor and the second sensor, the information including the RF signature and the another signature.

14. The system of claim 13, wherein the on-board controller configured to:
determine the position of the vehicle on the guideway based on information received from the first sensor and the second sensor comprises the on-board controller being configured to:
determine a first position of the vehicle on the guideway based on information received from the first sensor; and
determine a second position of the vehicle on the guideway based on information received from the second sensor; or
determine the distance from the position of the vehicle to the stopping location along the guideway based on information received from the first sensor comprises the on-board controller being configured to:
determine a first distance from the position of the vehicle to the stopping location along the guideway based on information received from the first sensor, the marker being located at the stopping location; and
determine a second distance from the position of the vehicle to the stopping location along the guideway based on information received from the second sensor.

15. The system of claim 14, wherein the on-board controller is further configured to:
compare the first distance with the second distance or compare the first position with the second position;

determine that the first sensor and the second sensor are not faulty, if the first position does not differ by more than a predefined tolerance from the second position;

determine that one of the first sensor or the second sensor is faulty, if the first position differs by more than the predefined tolerance from the second position;

determine that the first sensor and the second sensor are not faulty, if the first distance does not differ by more than the predefined tolerance from the second distance; and determine that one of the first sensor or the second sensor is faulty, if the first distance differs by more than the predefined tolerance from the second distance.

16. The system of claim 13, wherein the metasurface plate further comprises:
    a barcode; or
    a quick response (QR) code.

17. The system of claim 16, wherein
    the first sensor is configured to measure an echo signal received from the metasurface plate, and
    the second sensor is configured to measure a reflected signal received from the barcode or the QR code.

18. The system of claim 13, wherein the on-board controller is further configured to:
    determine a start point of the metasurface plate based on a first sequence of symbols associated with the first portion of the metasurface plate; and
    determine an end point of the metasurface plate based on a second sequence of symbols associated with the third portion of the metasurface plate.

19. A method, comprising:
    detecting, by a first sensor, a radio frequency (RF) signature of at least a marker, the first sensor being on a first end of a vehicle along a guideway, and being a radar detection device, and the marker being a metasurface plate including at least a first retroreflector element, a first absorbing element, and a first diffused element between the first retroreflector element and the first absorbing element;
    detecting, by a second sensor, another signature of at least the marker, the second sensor being on the first end of the vehicle or a second end of the vehicle opposite from the first end of the vehicle, and the second sensor being another radar detection device, a camera, a laser imaging detection and ranging (LIDAR) device or an infrared radiation (IR) sensor detection device; and
    determining, by an on-board controller, at least:
        a position of the vehicle on the guideway based on information received from at least the first sensor or the second sensor, or
        a distance from the position of the vehicle to a stopping location along the guideway based on the information received from the first sensor or the second sensor, the marker being located at the stopping location, the information including the RF signature and the another signature.

20. The method of claim 19, wherein
    detecting by the first sensor, the RF signature of at least the marker comprises:
        transmitting an RF signal from the first sensor towards the metasurface plate; and
        receiving, by the first sensor, a reflected RF signal from the metasurface plate, wherein the reflected RF signal has the RF signature that identifies the position of the vehicle;
    detecting by the second sensor, the another signature of at least the marker comprises:
        transmitting another signal from the second sensor towards the metasurface plate; and
        receiving, by the second sensor, a reflected another signal from the metasurface plate, the another signature has the another signature that identifies the position of the vehicle.

21. The method of claim 19, wherein determining the position of the vehicle on the guideway based on information received from at least the first sensor or the second sensor comprises:
    measuring a set of signal to noise ratios (SNRs) based on a corresponding received RF signal from the metasurface plate;
    determining a symbol sequence of the corresponding metasurface plate from the set of SNRs of the corresponding metasurface plate;
    identifying a beginning portion of the metasurface plate and an end portion of the metasurface plate based on the symbol sequence of the corresponding beginning portion or the corresponding end portion of the metasurface plate;
    determining a numerical value of a middle portion of the metasurface plate based on the corresponding symbol sequence of the middle portion of the metasurface plate;
    determining a metasurface reference position based on the numerical value of the corresponding middle portion of the metasurface plate;
    determining a distance from the first sensor or the second sensor to the metasurface plate; and
    determining the position of the vehicle from the metasurface reference position and the distance from the first sensor or the second sensor to the metasurface plate.

* * * * *